US010939470B2

United States Patent
Hosseini et al.

(10) Patent No.: US 10,939,470 B2
(45) Date of Patent: Mar. 2, 2021

(54) COLLISION AVOIDANCE FOR SCHEDULING REQUESTS AND UPLINK CONTROL INFORMATION

(71) Applicant: QUALCOMM Incorporated, San Diego, CA (US)

(72) Inventors: Seyedkianoush Hosseini, San Diego, CA (US); Amir Farajidana, Sunnyvale, CA (US); Lai Wei, Boulder, CO (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/267,326

(22) Filed: Feb. 4, 2019

(65) Prior Publication Data

US 2019/0246432 A1   Aug. 8, 2019

Related U.S. Application Data

(60) Provisional application No. 62/627,620, filed on Feb. 7, 2018.

(51) Int. Cl.
*H04W 74/08* (2009.01)
*H04L 5/00* (2006.01)
(Continued)

(52) U.S. Cl.
CPC ....... *H04W 74/0816* (2013.01); *H04L 1/1671* (2013.01); *H04L 1/1854* (2013.01);
(Continued)

(58) Field of Classification Search
CPC . H04W 74/08; H04W 72/12; H04W 74/0816; H04W 72/1284; H04L 5/00;
(Continued)

(56) References Cited

U.S. PATENT DOCUMENTS

2018/0076942 A1* 3/2018 Nory .................. H04W 52/346
2019/0268946 A1* 8/2019 Harada ................ H04W 28/04

FOREIGN PATENT DOCUMENTS

WO    WO-2017173177 A1    10/2017

OTHER PUBLICATIONS

Huawei et al: "Discussion on SR for Shortened TTI", Feb. 13, 2017-Feb. 17, 2017, Feb. 12, 2017 (Feb. 12, 2017), 4 Pages, (Year: 2017) (Year: 2017).*

(Continued)

*Primary Examiner* — Kyaw Z Soe
(74) *Attorney, Agent, or Firm* — Holland & Hart LLP

(57) ABSTRACT

Methods, systems, and devices for wireless communications are described. A user equipment (UE) may identify that a scheduling request (SR) is to be transmitted on a first uplink control channel having a first transmission time interval (TTI) duration and identify that acknowledgment/negative acknowledgment (ACK/NACK) information is scheduled for transmission on a second uplink control channel having a second TTI duration greater than the first TTI duration, where the first uplink control channel and the second uplink control channel overlap in time. The UE may determine that the ACK/NACK information is to be transmitted with the SR on the first uplink control channel based on the overlapping first uplink control channel and second uplink control channel, and may determine resources of the first uplink control channel to be used for transmission of SR and ACK/NACK information. The UE may transmit the SR and the ACK/NACK information on the determined resources.

44 Claims, 17 Drawing Sheets

(51) Int. Cl.
 *H04W 72/12* (2009.01)
 *H04L 1/18* (2006.01)
 *H04L 1/16* (2006.01)
(52) U.S. Cl.
 CPC .......... *H04L 1/1861* (2013.01); *H04L 1/1864* (2013.01); *H04L 5/0055* (2013.01); *H04W 72/1284* (2013.01)
(58) Field of Classification Search
 CPC ... H04L 1/1854; H04L 5/0055; H04L 1/1861; H04L 1/1671; H04L 1/1864
 See application file for complete search history.

(56) References Cited

OTHER PUBLICATIONS

Huawei et al: "Discussion on SR for Shortened TTI", 3GPP Draft; R1-1703070, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 13, 2017-Feb. 17, 2017, Feb. 12, 2017 (Feb. 12, 2017), 4 Pages, XP051210208, Retrieved from the Internet: URL: http://www.3gpp.org/ftp/Meetings_3GPP_SYNC/RAN1/Docs/ [retrieved on Feb. 12, 2017].
International Search Report and Written Opinion—PCT/US2019/016641—ISA/EPO—dated Jun. 28, 2019.
Partial International Search Report—PCT/US2019/016641—ISA/EPO—dated May 6, 2019.

\* cited by examiner

COLLISION AVOIDANCE FOR SCHEDULING REQUESTS AND UPLINK CONTROL INFORMATION

CROSS REFERENCES

The present Application for Patent claims the benefit of U.S. Provisional Patent Application No. 62/627,620 by Hosseini et al., entitled "COLLISION AVOIDANCE FOR SCHEDULING REQUESTS AND UPLINK CONTROL INFORMATION," filed Feb. 7, 2018, assigned to the assignee hereof, and expressly incorporated by reference in its entirety herein.

BACKGROUND

The following relates generally to wireless communication, and more specifically to collision avoidance for a scheduling request (SR) and uplink control information (UCI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may have uplink control information to transmit simultaneously on more than one channel. UEs that lack capabilities for simultaneous transmissions on multiple channels may experience collisions between the uplink transmissions. If unresolved, such collisions may reduce throughput on one or more of the channels. Further, a UE may not know which resources to transmit uplink control information on in the event of a collision, which may affect the UE's ability to transmit data to the base station.

SUMMARY

The described techniques relate to improved methods, systems, devices, or apparatuses that support collision avoidance for scheduling requests (SRs) and uplink control information. Generally, the described techniques provide for selecting short physical uplink control channel (sPUCCH) resources for the transmission of uplink control information (UCI) when the sPUCCH and a physical uplink control channel and/or physical uplink shared channel (PUCCH/PUSCH) collide and the UE may not be capable of simultaneous transmission of sPUCCH and PUCCH/PUSCH. For instance, a user equipment (UE) may identify a collision between an SR to be transmitted on sPUCCH and hybrid automatic repeat request (HARQ) feedback scheduled for transmission on PUCCH/PUSCH at the same time (e.g., where the sPUCCH and PUCCH/PUSCH overlap in time). In such cases, the HARQ feedback and SR may be consolidated to be transmitted on sPUCCH, and the UE may determine which resources of sPUCCH to use for the transmission of the SR and the HARQ feedback. In some examples, one or more resources within sPUSCH for the transmission of the SR and HARQ feedback may be configured for such transmissions. The sPUCCH resources to be used may depend on the number of bits in the HARQ feedback, a maximum coding rate, the timing of a scheduling request trigger, the logical channel used, and the like.

A method of wireless communication is described. The method may include identifying that an SR is to be transmitted on a first uplink control channel message having a first transmission time interval (TTI) duration, identifying that acknowledgement/negative acknowledgment (ACK/NACK) information is scheduled for transmission on a second uplink control channel message having a second TTI duration that is greater than the first TTI duration, where the first uplink control channel message and the second uplink control channel message overlap in time, determining that the ACK/NACK information is to be transmitted with the SR on the first uplink control channel message based on the first uplink control channel message overlapping with the second uplink control channel message, determining resources of the first uplink control channel message to be used for transmission of the SR and the ACK/NACK information, and transmitting the SR and the ACK/NACK information on the determined resources of the first uplink control channel message.

An apparatus for wireless communication is described. The apparatus may include means for identifying that an SR is to be transmitted on a first uplink control channel message having a first TTI duration, means for identifying that ACK/NACK information is scheduled for transmission on a second uplink control channel message having a second TTI duration that is greater than the first TTI duration, where the first uplink control channel message and the second uplink control channel message overlap in time, means for determining that the ACK/NACK information is to be transmitted with the SR on the first uplink control channel message based on the first uplink control channel message overlapping with the second uplink control channel message, means for determining resources of the first uplink control channel message to be used for transmission of the SR and the ACK/NACK information, and means for transmitting the SR and the ACK/NACK information on the determined resources of the first uplink control channel message.

Another apparatus for wireless communication is described. The apparatus may include a processor, memory in electronic communication with the processor, and instructions stored in the memory. The instructions may be operable to cause the processor to identify that an SR is to be transmitted on a first uplink control channel message having a first TTI duration, identify that ACK/NACK information is scheduled for transmission on a second uplink control channel message having a second TTI duration that is greater than the first TTI duration, where the first uplink control channel message and the second uplink control channel message overlap in time, determine that the ACK/NACK information is to be transmitted with the SR on the first uplink control channel message based on the first uplink control channel message overlapping with the second uplink control channel message, determine resources of the first uplink control channel message to be used for transmission of the SR and the ACK/NACK information, and transmit the SR and the ACK/NACK information on the determined resources of the first uplink control channel message.

A non-transitory computer-readable medium for wireless communication is described. The non-transitory computer-readable medium may include instructions operable to cause a processor to identify that an SR is to be transmitted on a first uplink control channel message having a first TTI duration, identify that ACK/NACK information is scheduled for transmission on a second uplink control channel message having a second TTI duration that is greater than the first TTI duration, where the first uplink control channel message and the second uplink control channel message overlap in time, determine that the ACK/NACK information is to be transmitted with the SR on the first uplink control channel message based on the first uplink control channel message overlapping with the second uplink control channel message, determine resources of the first uplink control channel message to be used for transmission of the SR and the ACK/NACK information, and transmit the SR and the ACK/NACK information on the determined resources of the first uplink control channel message.

Some examples of the method, apparatus, and non-transitory computer-readable medium described herein may further include processes, features, means, or instructions for determining a format of the first uplink control channel message based on a size of the ACK/NACK information, where the format of the first uplink control channel message corresponds to a set of resources. Some examples of the method, apparatus, and non-transitory computer-readable medium described herein may further include processes, features, means, or instructions for identifying an SR configuration that indicates first resources from the set of resources to be used for transmitting the SR and the ACK/NACK information in accordance with the format, where the determined resources include the first resources.

In some examples of the method, apparatus, and non-transitory computer-readable medium described herein, the ACK/NACK information is associated with communications using the second TTI duration. In some examples of the method, apparatus, and non-transitory computer-readable medium described herein, determining the format of the first uplink control channel message includes identifying the format based on the first TTI duration, where the first TTI duration includes one of a slot or a duration less than the slot, and where the format includes an sPUCCH format 3 or an sPUCCH format 4. In some examples of the method, apparatus, and non-transitory computer-readable medium described herein, identifying the SR configuration includes identifying the SR configuration from a set of configurations for the transmission of the ACK/NACK information, or the SR, or a combination thereof.

In some examples of the method, apparatus, and non-transitory computer-readable medium described herein, a first configuration from the set of configurations includes an indication of whether the SR may be to be transmitted on the first uplink control channel message or the second uplink control channel message. In some examples of the method, apparatus, and non-transitory computer-readable medium described herein, a second configuration from the set of configurations indicates whether the transmission of SR may be to be deferred.

In some examples of the method, apparatus, and non-transitory computer-readable medium described herein, a third configuration from the set of configurations indicates that the second uplink control channel message may be to be dropped. In some examples of the method, apparatus, and non-transitory computer-readable medium described herein, a fourth configuration from the set of configurations indicates that the second uplink control channel message and the ACK/NACK information may be to be dropped.

In some examples of the method, apparatus, and non-transitory computer-readable medium described herein, the SR configuration may be received via downlink control information (DCI), radio resource control (RRC) messaging, or a combination thereof. In some examples of the method, apparatus, and non-transitory computer-readable medium described herein, the SR configuration may be preconfigured.

Some examples of the method, apparatus, and non-transitory computer-readable medium described herein may further include processes, features, means, or instructions for determining a format of the first uplink control channel message based on a size of the ACK/NACK information, where the format of the first uplink control channel message corresponds to a set of resources. Some examples of the method, apparatus, and non-transitory computer-readable medium described herein may further include processes, features, means, or instructions for identifying an SR configuration that indicates two or more resources from the set of resources to be used for transmitting the SR and the ACK/NACK information in accordance with the format, where the determined resources may be selected from the two or more resources based on the SR configuration.

Some examples of the method, apparatus, and non-transitory computer-readable medium described herein may further include processes, features, means, or instructions for identifying a coding rate threshold for the resources of the first uplink control channel message. In some examples of the method, apparatus, and non-transitory computer-readable medium described herein, determining the resources of the first uplink control channel message includes determining the resources from the two or more resources based on the coding rate threshold, the size of the ACK/NACK information, and a number of cyclic redundancy check (CRC) bits.

Some examples of the method, apparatus, and non-transitory computer-readable medium described herein may further include processes, features, means, or instructions for selecting, from the two or more resources, a first resource for transmitting the SR and the ACK/NACK information such that a coding rate of the first resource satisfies the coding rate threshold based on a payload size of the first resource, where the first resource may be a smallest resource of the two or more resources.

Some examples of the method, apparatus, and non-transitory computer-readable medium described herein may further include processes, features, means, or instructions for selecting, from the two or more resources, a first resource for transmitting the SR and the ACK/NACK information. Some examples of the method, apparatus, and non-transitory computer-readable medium described herein may further include processes, features, means, or instructions for determining that the first resource does not satisfy the coding rate threshold based on a payload size of the first resource. Some examples of the method, apparatus, and non-transitory computer-readable medium described herein may further include processes, features, means, or instructions for selecting, from the two or more resources, a second resource such that a coding rate of the second resource satisfies the coding rate threshold, where the second resource may be larger than the first resource.

In some examples of the method, apparatus, and non-transitory computer-readable medium described herein, each of the two or more resources may be mapped to a number of resource blocks (RBs).

In some examples of the method, apparatus, and non-transitory computer-readable medium described herein, determining the format of the first uplink control channel message includes identifying the format based on the first TTI duration, where the first TTI duration includes one of a slot or a duration less than the slot, and where the format includes an sPUCCH format 3 or an sPUCCH format 4.

Some examples of the method, apparatus, and non-transitory computer-readable medium described herein may further include processes, features, means, or instructions for determining a format of the first uplink control channel message based on a size of the ACK/NACK information, where the format of the first uplink control channel message corresponds to a set of resources. Some examples of the method, apparatus, and non-transitory computer-readable medium described herein may further include processes, features, means, or instructions for identifying a most recent instance of the first uplink control channel message having the determined format that was indicated to the UE, where determining the resources of the first uplink control channel message to be used for transmission of the SR and the ACK/NACK information may be based on the most recent instance, or the determined format, or a combination thereof.

In some examples of the method, apparatus, and non-transitory computer-readable medium described herein, determining the format of the first uplink control channel message includes identifying a format configuration for the resources based on the first TTI duration, the first TTI duration including a slot or duration less than the slot, and where the format includes an sPUCCH format 3 or an sPUCCH format 4.

Some examples of the method, apparatus, and non-transitory computer-readable medium described herein may further include processes, features, means, or instructions for determining an absence of DCI including an ACK/NACK resource indicator (ARI) for the first uplink control channel message, where determining the resources of the first uplink control channel message to be used for transmission of the SR and the ACK/NACK information may be based on the absence of the DCI.

Some examples of the method, apparatus, and non-transitory computer-readable medium described herein may further include processes, features, means, or instructions for receiving an SR configuration that indicates the SR may be to be transmitted on the first uplink control channel message. Some examples of the method, apparatus, and non-transitory computer-readable medium described herein may further include processes, features, means, or instructions for determining that a size of the ACK/NACK information may be greater than two bits.

A method of wireless communication is described. The method may include receiving an indication of a set of control channel resources of an uplink control channel to be used for an uplink control message, identifying a coding rate threshold for the uplink control message, determining a payload size of the uplink control message, selecting, from the set of control channel resources, a control channel resource based on the coding rate threshold and the determined payload size of the uplink control message, and transmitting the uplink control message to a base station using the selected control channel resource.

An apparatus for wireless communication is described. The apparatus may include means for receiving an indication of a set of control channel resources of an uplink control channel to be used for an uplink control message, means for identifying a coding rate threshold for the uplink control message, means for determining a payload size of the uplink control message, means for selecting, from the set of control channel resources, a control channel resource based on the coding rate threshold and the determined payload size of the uplink control message, and means for transmitting the uplink control message to a base station using the selected control channel resource.

Another apparatus for wireless communication is described. The apparatus may include a processor, memory in electronic communication with the processor, and instructions stored in the memory. The instructions may be operable to cause the processor to receive an indication of a set of control channel resources of an uplink control channel to be used for an uplink control message, identify a coding rate threshold for the uplink control message, determine a payload size of the uplink control message, select, from the set of control channel resources, a control channel resource based on the coding rate threshold and the determined payload size of the uplink control message, and transmit the uplink control message to a base station using the selected control channel resource.

A non-transitory computer-readable medium for wireless communication is described. The non-transitory computer-readable medium may include instructions operable to cause a processor to receive an indication of a set of control channel resources of an uplink control channel to be used for an uplink control message, identify a coding rate threshold for the uplink control message, determine a payload size of the uplink control message, select, from the set of control channel resources, a control channel resource based on the coding rate threshold and the determined payload size of the uplink control message, and transmit the uplink control message to a base station using the selected control channel resource.

In some examples of the method, apparatus, and non-transitory computer-readable medium described herein, selecting the control channel resource includes selecting the control channel resource based on the coding rate threshold, a size of ACK/NACK information within the uplink control message, and a number of CRC bits for the uplink control message. In some examples of the method, apparatus, and non-transitory computer-readable medium described herein, selecting the control channel resource includes selecting the control channel resource such that a coding rate of the control channel resource satisfies the coding rate threshold, where the control channel resource may be a smallest resource of the set of control channel resources.

In some examples of the method, apparatus, and non-transitory computer-readable medium described herein, selecting the control channel resource includes selecting the control channel resource from the set of control channel resources. Some examples of the method, apparatus, and non-transitory computer-readable medium described herein may further include processes, features, means, or instructions for determining that the control channel resource does not satisfy the coding rate threshold based on the payload size of the uplink control message. Some examples of the method, apparatus, and non-transitory computer-readable medium described herein may further include processes, features, means, or instructions for selecting, from the set of control channel resources, a second control channel resource such that a coding rate of the second control channel resource satisfies the coding rate threshold, where the second control channel resource may be larger than the control channel resource.

Some examples of the method, apparatus, and non-transitory computer-readable medium described herein may further include processes, features, means, or instructions for receiving an indication of which of the set of control channel resources to use for the uplink control message, where the indication may be received via an ARI of DCI. In some examples of the method, apparatus, and non-transitory computer-readable medium described herein, a format of the uplink control channel may be an sPUCCH format 4.

A method of wireless communication is described. The method may include configuring a set of resources of an uplink control channel for the transmission of an uplink control message based on a format and a coding rate threshold of the uplink control message, where the uplink control message has a first TTI duration that is less than a second TTI duration, and transmitting, to a UE, an indication of the set of resources of the uplink control channel to use for the uplink control message.

An apparatus for wireless communication is described. The apparatus may include means for configuring a set of resources of an uplink control channel for the transmission of an uplink control message based on a format and a coding rate threshold of the uplink control message, where the uplink control message has a first TTI duration that is less than a second TTI duration, and means for transmitting, to a UE, an indication of the set of resources of the uplink control channel to use for the uplink control message.

Another apparatus for wireless communication is described. The apparatus may include a processor, memory in electronic communication with the processor, and instructions stored in the memory. The instructions may be operable to cause the processor to configure a set of resources of an uplink control channel for the transmission of an uplink control message based on a format and a coding rate threshold of the uplink control message, where the uplink control message has a first TTI duration that is less than a second TTI duration, and transmit, to a UE, an indication of the set of resources of the uplink control channel to use for the uplink control message.

A non-transitory computer-readable medium for wireless communication is described. The non-transitory computer-readable medium may include instructions operable to cause a processor to configure a set of resources of an uplink control channel for the transmission of an uplink control message based on a format and a coding rate threshold of the uplink control message, where the uplink control message has a first TTI duration that is less than a second TTI duration, and transmit, to a UE, an indication of the set of resources of the uplink control channel to use for the uplink control message.

In some examples of the method, apparatus, and non-transitory computer-readable medium described herein, transmitting the indication includes transmitting the indication via an ARI of DCI. In some examples of the method, apparatus, and non-transitory computer-readable medium described herein, each of the set of resources may be mapped to a number of RBs. In some examples of the method, apparatus, and non-transitory computer-readable medium described herein, the format includes an sPUCCH format 4.

DETAILED DESCRIPTION

Figure 1:
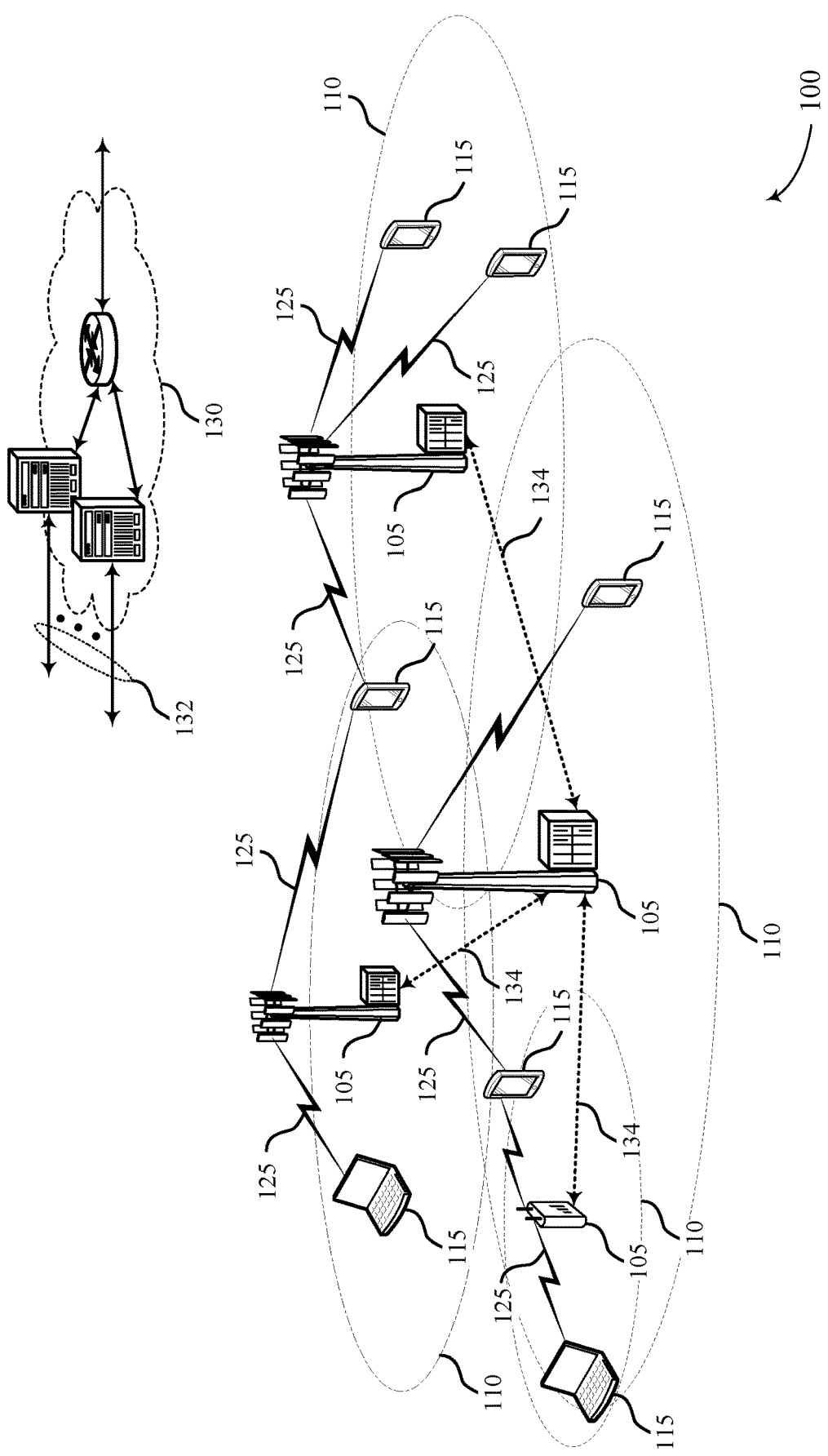
FIG. 1 illustrates an example a wireless communications system that supports collision avoidance for scheduling requests (SRs) and uplink control information (UCI) in accordance with aspects of the present disclosure.

Some wireless communications system may support the use of different transmission time interval (TTI) durations for transmissions between wireless devices. By way of example, a user equipment (UE) may be configured for both low latency and non-low latency communication with a base station. The UE may use a first TTI for the non-low latency communication and a second TTI (e.g., a shortened TTI (sTTI)) for the low latency communication, where the sTTI has a duration less than a duration of the first TTI. The first TTI (i.e., the longer duration TTI) may have a legacy configuration—e.g., the longer duration TTI may have a numerology that is based on a standardized radio access technology (RAT), such as Long Term Evolution (LTE). The sTTI may employ a different numerology, which may be compatible with the numerology of the longer duration TTI.

Wireless communications using different TTI durations may have different hybrid automatic repeat request (HARQ) feedback timing, and the UE may be scheduled for overlapping uplink control information (UCI) and scheduling request (SR) transmissions. For example, a UE may have HARQ feedback to be transmitted on a channel having a longer duration TTI (e.g., a non-low latency or legacy physical uplink control channel (PUCCH) and/or physical uplink shared channel (PUSCH) having a 1 millisecond (ms) duration) and SR to be transmitted on a channel having a shorter duration TTI (e.g., a shortened PUCCH (sPUCCH) for an sTTI including two or three symbol periods, a slot, etc.). In some examples, simultaneous transmission of the HARQ feedback and the SR on the different channels may not be possible, and the UE may determine whether to transmit UCI on PUCCH or on sPUCCH. For instance, acknowledgment/negative acknowledgment (ACK/NACK) information may be transmitted along with the SR on sPUCCH, while a transmission of an overlapping PUCCH/ PUSCH may be dropped to give priority to the sPUCCH.

In some cases, the number of HARQ bits may impact the format of sPUCCH when used for transmitting an SR and the ACK/NACK information. For example, a specific format (e.g., format 1a or 1b) of TTIs may be used to convey up to two bits of HARQ ACK/NACK and SR on sPUCCH. In another example, a different format (e.g., format 4) may be used to convey more than two bits of HARQ ACK/NACK and SR. In an exemplary format of the sPUCCH format 4 (e.g., having four resources), one of the four resources configured by Radio Resource Control (RRC) messages may be indicated to a UE via a 2-bit field in short downlink control information (sDCI). In some examples, the UE may be provided with an SR configuration (e.g., through RRC messaging) in which certain channels may be used for the transmission of SR. The UE may thus determine which channel (e.g., PUCCH or sPUCCH), format, and resources to use based on an SR configuration for logical channels, the number of HARQ bits, and a timing of the SR trigger. However, in some cases, the UE may not receive an indication of the configuration of resources due to a lack of a downlink grant, downlink control information (DCI), and an ACK/NACK resource indicator (ARI). As a result, situations may arise where the UE may determine to avoid collisions by consolidating HARQ feedback and SR on the same channel, but may not be aware of which resources to use on that channel for the transmission of ACK/NACK information and an SR.

As described herein, a UE may be configured with resources for the transmission of SR and ACK/NACK information to avoid collisions between HARQ feedback for a longer TTI and an SR for an sTTI. For example, a particular resource for sPUCCH format 4 (or sPUCCH format 3, depending on the duration of the sTTI) may be configured for combined SR and ACK/NACK transmissions. The ACK/NACK transmissions may be in response to a downlink message transmitted on a longer TTI having a different length than the sTTI associated with the SR. In other examples, multiple resources may be configured for SR and ACK/NACK transmissions using sPUCCH format 4, and the UE may select one of the multiple resources based on a smallest set of resources that does not exceed a maximum coding rate for the size (e.g., the number of bits) of the ACK/NACK information. In such cases, the coding rate for respective sets of resources may be configured by the base station (e.g., through RRC messaging). Additionally or alternatively, the UE may identify a most recent instance of the sPUCCH format 4 (or sPUCCH format 3) that was indicated to the UE. In such cases, the UE may transmit the SR and the ACK/NACK information using resources based on the most recent format indication that was identified. In any event, the described techniques may enable the UE to coherently determine the resources to use for combined transmission of SR and HARQ feedback, and avoid ambiguity in the selection of resources for such transmissions.

Aspects of the disclosure are initially described in the context of a wireless communications system. The wireless communication system may support different resource configurations of the sPUCCH. Additional details about resource determination for HARQ and SR in a system that supports collision avoidance for SRs and UCI are described. Aspects of the disclosure are further illustrated by and described with reference to apparatus diagrams, system diagrams, and flowcharts that relate to collision avoidance for SRs and UCI.

FIG. 1 illustrates an example of a wireless communications system 100 that supports collision avoidance for SRs and UCI in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

A physical downlink control channel (PDCCH) carries DCI in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, a modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback (which may also be referred to as ACK/NACK information or ACK/NACK data) in a specific slot for data received in a previous symbol in the slot. In other cases, the device may provide HARQ feedback in a subsequent slot, or according to some other time interval. HARQ feedback may include one or more bit.

PUCCH or sPUCCH may carry UCI and may be mapped to a control channel defined by a code and a number of consecutive resource blocks. Uplink control signaling may depend on the presence of timing synchronization for a cell.

In some cases, PUCCH resources for SR and channel quality information (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs 115 may or may not have a dedicated SR channel). In some cases, PUCCH/sPUCCH may be classified into various formats based on the type of information carried. For instance, different formats may be used for HARQ feedback of different sizes (e.g., 1-bit HARQ feedback vs. 2-bit HARQ feedback, vs. up to 20 bits of HARQ feedback, etc.). In some cases, a base station 105 may be aware of the size of HARQ feedback to be provided by a UE 115, which may be based on an amount of transmitted downlink data sent by the base station 105. Accordingly, the base station 105 may have knowledge of a PUCCH or sPUCCH format to be used for the transmission of HARQ feedback.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 ms, where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of sTTIs or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Collisions may occur between PUSCH/PUCCH and sPUCCH. For instance, PUSCH/PUCCH scheduled for transmission during a 1 ms TTI may collide with an SR to be transmitted using an sTTI. If simultaneous transmission is not possible (e.g., conflicting transmissions on a same cell, or due to a capability of the UE 115 that prohibits simultaneous transmission on different cells, etc.), PUSCH/PUCCH transmission may be stopped, and the HARQ ACK/NACK from the PUSCH/PUCCH may be sent with the SR on the sPUCCH. In cases when the HARQ ACK/NACK information is greater than 2 bits and is to be sent on the sPUCCH, the HARQ ACK/NACK information may be included on the sPUCCH in a specific format (e.g., format 4). Format 4 includes a number of different options for selecting the resources on which the HARQ ACK/NACK information is to be transmitted in sPUCCH. In some examples, when HARQ ACK/NACK information is to be included in sPUCCH on format 4, the UE 115 may receive an indication of which format 4 resources the HARQ ACK/NACK information is to be transmitted on (e.g., an ARI may be received in a grant). However, in cases where transmission of the HARQ ACK/NACK on the sPUCCH is due to a collision between the sPUCCH and a PUSCH/PUCCH already scheduled to convey the HARQ ACK/NACK information, an ARI may not have been received. In such cases, the UE 115 may determine which sPUCCH resources should be used to transmit the SR and ACK/NACK information. Wireless communications system 100 may support the configuration of one or more sets of resources for the UE 115 to use for the transmission of an SR and ACK/NACK information on sPUCCH, for example, in the absence of a downlink grant when the ACK/NACK information is greater than 2 bits. As an example, a UE 115 may identify that a collision exists between an SR and HARQ feedback, and may identify a configured resource within an sPUCCH for a combined transmission of the SR and HARQ feedback. In other cases, multiple sPUCCH resources may be configured, and the UE 115 may select one of the resources such that a configured maximum coding rate is not exceeded when transmitting the SR and the HARQ feedback.

Figure 2:
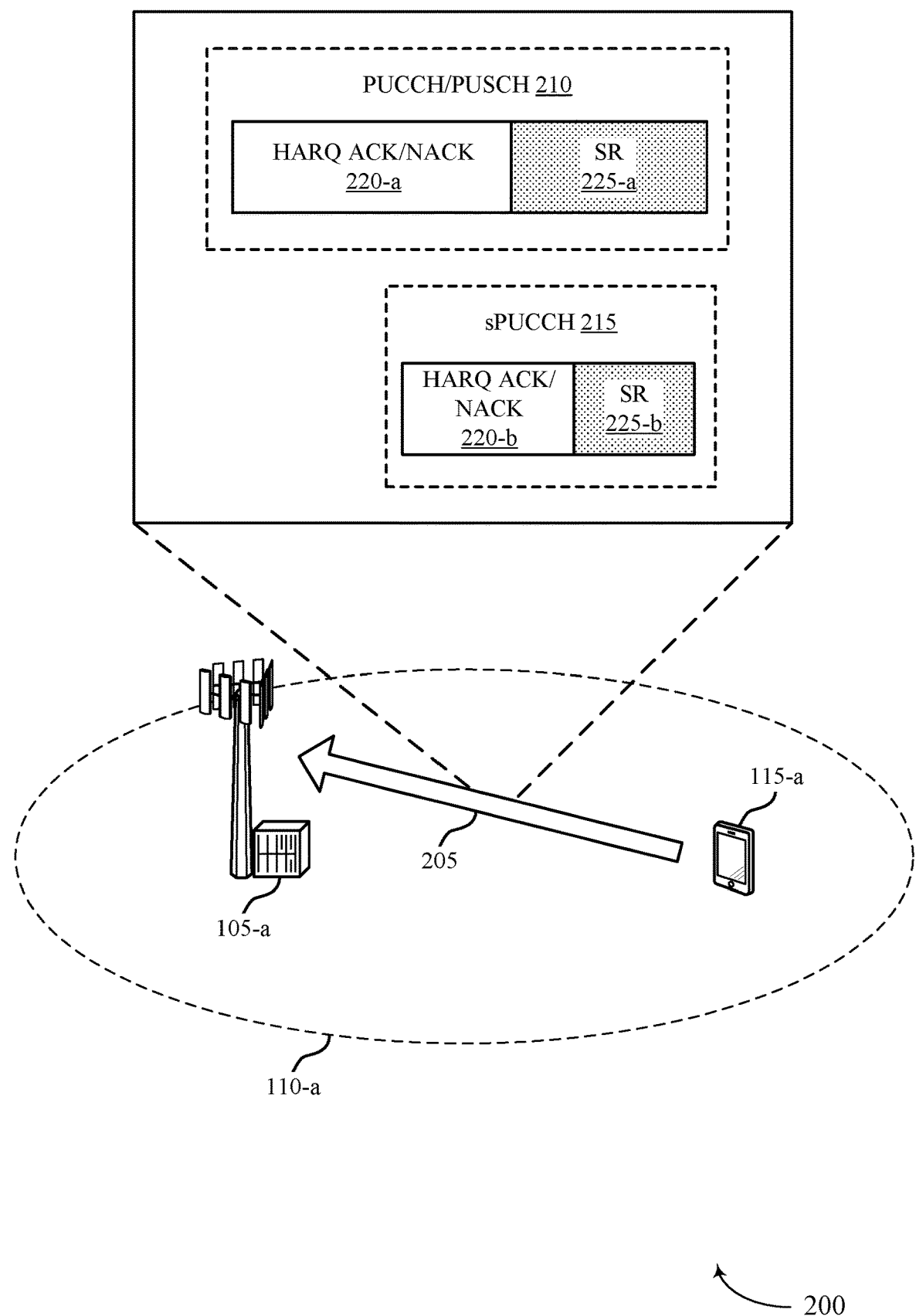
FIG. 2 illustrates an example of a wireless communications system that supports collision avoidance for SRs and UCI in accordance with aspects of the present disclosure.

FIG. 2 illustrates an example of a wireless communications system 200 that supports collision avoidance for SRs and UCI in accordance with aspects of the present disclosure. Wireless communications system 200 may include base station 105-a and UE 115-a, which may be examples of the corresponding devices described with reference to FIG. 1. Base station 105-a and UE 115-a may communicate over a communication link 205 that includes PUCCH/PUSCH 210 and sPUCCH 215. PUCCH/PUSCH 210 and sPUCCH 215 may be on the same or different carriers, and may be TDD or FDD.

Base station 105-a may transmit using an sTTI on a downlink channel, which may be designated or configured for low latency communication (e.g., a shortened physical downlink control channel (sPDCCH) or a shortened physical downlink shared channel (sPDSCH)), and UE 115-a may transmit using an sTTI on an uplink channel, which may be designated or configured for low latency communication (e.g., using sPUCCH 215 or a sPUSCH).

UE 115-a or base station 105-a may be configured to operate using both low latency and non-low latency communications. Low latency and non-low latency communication may use different length TTIs and downlink HARQ timing. UE 115-a or base station 105-a may transmit using a TTI that has a shorter duration than another TTI. The relatively shorter TTI may be referred to as a low latency TTI or an sTTI. The non-low latency TTI may have a longer duration relative to the sTTI. As mentioned above, a non-low latency TTI may also be referred to as a legacy TTI. For example, some earlier versions of a wireless communication standard, such as LTE, may employ such legacy TTIs. As described herein, non-low latency TTI or legacy TTI may be used on PUCCH/PUSCH 210. PUCCH/PUSCH 210 may also be referred to as the long channel. A low latency TTI or an sTTI may be used on sPUCCH 215. Both PUCCH/PUSCH 210 and sPUCCH 215 may contain HARQ ACK/NACK 220 and SR 225 to be transmitted to base station 105-a.

In some cases, UE 115-a may experience collisions between scheduled PUCCH/PUSCH 210 and sPUCCH 215 transmissions (e.g., on the same or different carriers). Collisions may occur between PUCCH/PUSCH 210 and sPUCCH 215 in a same subframe. That is, sPUCCH 215 may be transmitted during an sTTI that overlaps with a scheduled transmission of PUCCH/PUSCH 210. If simultaneous transmission by UE 115-a is not possible, PUCCH/PUSCH 210 may be stopped (i.e., one or more bits of PUCCH/PUSCH 210 may be dropped from a transmission), and the UCI (e.g., HARQ ACK/NACK 220-a) from the PUCCH/PUSCH 210 may be sent on the sPUCCH 215. Accordingly, UE 115-a may decide which sPUCCH 215 resources should be used to transmit the SR 225-a and HARQ ACK/NACK 220-a. The SR configuration for the logical channel, the number of 1 ms HARQ ACK/NACK bits, and the SR triggering timeline may be considered in the decision and may impact the resources used to transmit the SR and HARQ ACK/NACK.

In some cases, a 1-bit HARQ ACK/NACK 220 and SR 225 may be configured for UE 115-a on two sPUCCH 215 resources based on whether a legacy physical downlink shared channel (PDSCH) is decoded successfully. One resource may be used for an SR 225 and an ACK, and the second resource may be used for an SR 225 and NACK. If HARQ ACK/NACK 220 is not present, for example, because no downlink transmission has been sent to UE 115-a, and an SR 225 is present, the resource allocated for the SR 225 and NACK may be used. The receiving base station 105-a may be aware if any HARQ ACK/NACK 220 is expected, and determine that only SR 225 is present. If HARQ ACK/NACK 220 is present and an SR 225 is not present, the HARQ ACK/NACK 220 may be transmitted on specific HARQ indicated resources. Base station 105-a may perform a two hypothesis check for legacy HARQ ACK/NACK when sTTI SR resources are configured. Base station 105-a may check both the PUCCH/PUSCH 210 and sPUCCH 215 for legacy HARQ ACK/NACK 220-a (e.g., since base station 105-a may not know that an SR 225 is being sent).

In some cases, a 2-bit HARQ ACK/NACK 220 and SR 225 may be configured for a UE 115-a on four sPUCCH 215 resources based on which, if any, legacy codeword is decoded successfully. The four resources may be configured such that there is a resource to convey each of SR and ACK-ACK, SR and NACK-NACK, SR and ACK-NACK, and SR and NACK-ACK. Similar to the 1-bit HARQ ACK/NACK and SR case described herein, if HARQ ACK/NACK 220 is not present, for example, because no downlink transmission has been sent to UE 115-a, and an SR 225 is present, the resource allocated for SR and NACK-NACK may be used. If HARQ ACK/NACK 220 is present and an SR 225 is not present, the HARQ ACK/NACK may be transmitted on specific HARQ indicated resources. Base station 105-a may perform a two hypothesis check for legacy HARQ ACK/NACK 220-a when sTTI SR resources are configured. Base station 105-a may check both the PUCCH/PUSCH 210 and sPUCCH for legacy HARQ ACK/NACK 220-a (e.g., since the base station 105-a may not know that an SR 225 is being sent).

SRs 225 may be configured by RRC based on logical channels. For example, the SR configuration at UE 115-a may be restricted for specific logical channels (e.g., sPUCCH and PUCCH). An indication such as "value sPUCCH" may be used to indicate that the SR cannot be sent on the sPUCCH, and an indication such as "value PUCCH" indicates that the SR cannot be sent on the PUCCH. In the case that there is not a restricted SR configuration, UE 115-a may be allowed to transmit the SR 225 on any SR resource in the sPUCCH or PUCCH.

If the MAC entity has resources for an SR 225 configured on one of PUCCH or sPUCCH, then those SR resources may be valid for all logical channels. If the MAC entity has resources for an SR 225 configured on both PUCCH and sPUCCH, two cases may be present. The first case may be that PUCCH resources are valid if no logical channel restriction is configured, or if a logical channel restriction allows SR 225 on PUCCH, for any of the logical channels. The second case may be that sPUCCH resources are valid if no logical channel restriction is configured, or if a logical channel restriction allows SR 225 on sPUCCH, for any of the logical channels. In summary, the SR 225 for some logical channels may be sent using one of PUCCH or sPUCCH, whereas the SR 225 for some other logical channels may be sent on both the PUCCH and the sPUCCH, and UE 115-*a* may decide which channel SR 225 should be mapped to.

When more than two bits of HARQ ACK/NACK 220-*b* may be sent on a sub-slot TTI, sPUCCH 215 may use a specific format (e.g., format 4). The format may be different from the format used when two or less bits of HARQ ACK/NACK 220-*b* are present for sub-slot TTI transmission. In some cases, UE 115-*a* may not receive a downlink sTTI grant and may not know which four resources of the configured sPUCCH 215 format resources should be used because ARI may not be available.

However, according to various aspects of the disclosure, legacy HARQ ACK/NACK 220-*a* and SR 225-*a* may be sent on the most recent four resources of the sPUCCH 215 as previously indicated to UE 115-*a*, for example, in the last received sDCI. The previous indication may not be related to the current SR 225 and HARQ ACK/NACK 220 to be transmitted. In a second example, the sPUCCH 215 format resources may be configured for the scenario when no downlink grant is sent, and more than two bits of legacy HARQ ACK/NACK 220 may be carried by the sPUCCH 215 to avoid collision. This configuration of resources may enable UE 115-*a* to efficiently determine the resources for the transmissions of HARQ ACK/NACK 220-*b* and SR 225-*b* using sPUCCH 215.

More than one format of the sPUCCH 215 may be used to convey SR 225-*b* and more than two bits HARQ ACK/NACK 220-*b*. For example, in slot sPUCCH format 3 and format 4, one of the four resources may be indicated to UE 115-*a* via a two-bit indicator in the DCI. Slot sPUCCH may refer to when a TTI spans an entire slot of the sPUCCH 215. If both format 3 and 4 are configured for UE 115-*a*, then format 3 may be used for 3-11 bits, and format 4 may be used for 12 or more bits. If only format 3 is configured for UE 115-*a*, then 3-11 bits may be transmitted. If only format 4 is configured for a UE 115-*a*, then 3 or more bits may be transmitted.

If SR 225 is present but no downlink grant has been received, then various options may exist for UE 115-*a*. In a first option, the legacy HARQ ACK/NACK 220 and SR 225 may be sent on the most recent sPUCCH 215 format (e.g., format 3 or 4) indicated to UE 115-*a*, for example, in DCI. The format determination may depend on the number of HARQ bits and the configured sPUCCH 215 formats at UE 115-*a*. In a second option, the sPUCCH 215 format (e.g., format 3 or 4) resources may be configured for the scenario when no downlink grant is sent, and more than two bits of legacy HARQ ACK/NACK may be carried by the sPUCCH 215 to avoid collision. In some cases, the configuration of resources for sPUCCH 215 may be indicated to UE 115-*a* via RRC messaging, or via DCI, or a combination of both. In other cases, the sPUCCH resources may be preconfigured or predetermined.

Multiple resources for sPUCCH 215 formats (e.g., format 4) may be configured by higher layers for both sub-slot and slot sPUCCH. For example, each resource may be mapped to a given number of resource blocks (e.g., one to eight resource blocks). A maximum coding rate may be defined (e.g., configured via RRC messaging), and depending on the payload size (e.g., number of HARQ ACK/NACK 220-*b* bits) and the CRC bits, UE 115-*a* may pick one of the configured resources. When a collision occurs between the PUCCH/PUSCH 210 and SR 225-*b* of the sPUCCH 215, the payload size may also include one or more SR bit(s). For example, for a given payload size, if a number resource blocks is used (e.g., the smallest amount of resource blocks) and the coding rate remains below the maximum value (e.g., satisfies a coding rate threshold), then UE 115-*a* may select the corresponding sPUCCH 215 resources. If the coding rate is greater than the maximum value (e.g., does not satisfy the threshold), then a larger number of resource blocks may be used, where the larger number of resource blocks may be associated with a relatively higher coding rate (e.g., as compared to a smaller number of resource blocks). UE 115-*a* may select the lowest number of resource blocks able to stay below the maximum coding rate. Base station 105-*a* may know the number of HARQ ACK/NACK bits, the maximum coding rate, and the configured resources, thus base station 105-*a* may know in case the PUCCH/PUSCH 210 is dropped as a result of SR 225-*b* transmission, which sPUCCH 215 resources may be used by UE 115-*a*. In some cases, base station 105-*a* may have to perform a two hypothesis check to determine if HARQ ACK/NACK 220 is present.

In some examples, even when collisions may not occur, base station 105-*a* may configure multiple resources for the transmission of UCI. For instance, base station 105-*a* may indicate which sPUCCH 215 format 4 resource should be used by UE 115-*a* via ARI, and may control the number of resource blocks. In such cases, each of the sPUCCH format 4 resources configured by RRC may be mapped to a different number of RBs.

Figure 3:
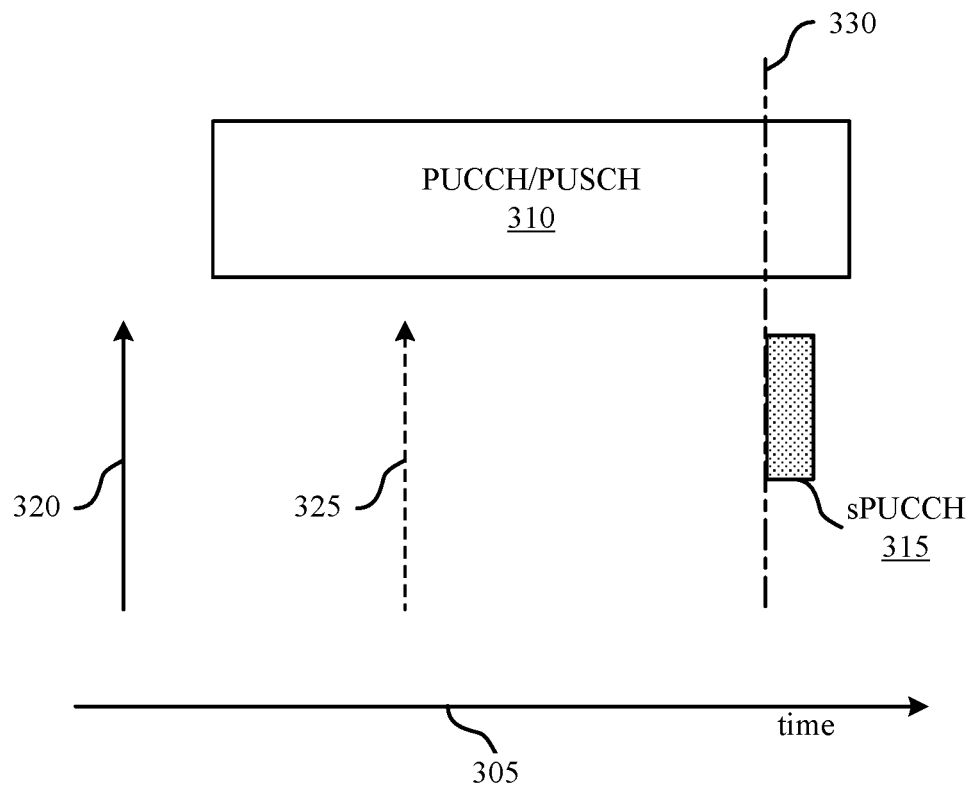
FIG. 3 illustrates an example of a timeline that supports collision avoidance for SRs and UCI in accordance with aspects of the present disclosure.

FIG. 3 illustrates an example of a timeline 300 that supports collision avoidance for SRs and UCI in accordance with aspects of the present disclosure. In some examples, timeline 300 may implement aspects of wireless communications system 100 and 200. Arrow 305 indicates the time axis of timeline 300. A PUCCH/PUSCH 310 transmission and/or sPUCCH transmission 315 may occur in timeline 300. The PUCCH/PUSCH 310 transmission and/or sPUCCH 315 transmission may contain SR and HARQ.

As illustrated, PUCCH/PUSCH 310 transmission and sPUCCH 315 transmission may overlap in time and collide. In order to avoid the collision, various examples of resource allocation for UCI between the PUCCH/PUSCH 310 and sPUCCH 315 are described below. However, there may be cases in which a collision cannot be avoided, and a UE 115 may use the techniques described herein to determine resources for the transmission of SR and ACK/NACK information to a base station 105 to further mitigate collisions.

If SR for a logical channel is triggered before the start of the PUCCH/PUSCH 310 transmission at time 320, there may be a number of cases to consider. In a first case, SR for the logical channel may be sent on PUCCH and sPUCCH. If the SR is sent on the PUCCH, then there may not be any collision (e.g., between PUCCH and sPUCCH) unless the UE 115 decides to send the SR on sPUCCH. In a second case, SR may be sent on PUCCH, and there may be no collision. In a third case, SR may be sent on sPUCCH 315 and a few alternatives may occur. In a first alternative, if sPUCCH 315 may collide with and ongoing PUCCH/PUSCH 310, then SR may not be sent and instead may be deferred until the next SR opportunity. In a second alternative, to avoid collision, PUCCH/PUSCH 310 may be dropped or stopped at time 330 or prior to the start of the SR opportunity on sPUCCH 315. In this example, the SR and HARQ ACK/NACK on the PUCCH/PUSCH 310 may be transmitted on an sTTI of sPUCCH 315. The UE 115 may determine sPUCCH 315 resources to use in this alternative. In a third alternative, the PUCCH/PUSCH 310 including the HARQ ACK/NACK may be dropped or stopped at time 330 prior to the start of the SR opportunity on the sPUCCH 315, and the SR may be sent on its own resources.

If SR for a logical channel is triggered after the start of the PUCCH/PUSCH 310 transmission at time 325, there may be a number of cases to consider. In a first case, SR may be sent on both PUCCH and sPUCCH such that no collision may occur if the SR is sent on the next SR PUCCH resources unless the UE 115 determines to map the SR to sPUCCH resource(s). In a second case, the SR may be sent on PUCCH, for example, the SR may wait to be sent on the next SR PUCCH resource. In this case, collisions may be avoided. In a third case, SR may be sent on sPUCCH and a few alternatives may occur. In a first alternative, if sPUCCH 315 will collide with an ongoing PUCCH/PUSCH 310, then SR may not be sent and instead may be deferred until the next SR opportunity. In a second alternative, to avoid collision, PUCCH/PUSCH 310 may be dropped or stopped at time 330 or prior to the start of the SR opportunity on sPUCCH 315. In this example, the SR and HARQ ACK/NACK on the PUCCH/PUSCH 310 may be transmitted on an sTTI of the sPUCCH 315. The UE 115 may determine the sPUCCH 315 resources to use in this alternative. In a third alternative, the PUCCH/PUSCH 310 including the HARQ ACK/NACK may be dropped or stopped prior to the start of the SR opportunity on the sPUCCH 315, and the SR may be sent on its own resources.

In some examples, the UE 115 may receive various configurations that may determine how and when the SR and/or HARQ ACK/NACK is transmitted. For example, the transmission of SR on PUCCH/PUSCH 310 or on sPUCCH 315 may be configured (where the UE 115 may have a choice if no configuration is received). Additionally, whether the transmission of SR can be deferred to a later SR opportunity can be configured for the UE 115. The ability of the UE 115 to drop PUCCH/PUSCH 310, or HARQ ACK/NACK, or both, may also be configured. When determining which case and alternative to transmit the uplink control information, UE 115 may also consider traffic type (e.g., low latency, ultra-reliable, mobile broadband, and the like) and/or logical channel type (e.g., control channel and traffic channel).

As described herein, there are cases of SR transmissions on the sPUCCH 315 that may still result in collisions with legacy ACK/NACK transmission on PUCCH/PUSCH, and the UE 115 may need to determine which resources to use for combined SR and ACK/NACK information transmissions on the sPUCCH 315. For instance, when the HARQ ACK/NACK is greater than 2 bits, when the UE 115 is configured for SR transmissions on sPUCCH (e.g., transmitting on PUCCH/PUSCH 310 may not be configured, or the UE 115 chooses to transmit on sPUCCH 315), and no DCI (or ARI) has been previously received, collisions of SR and a 1 ms HARQ ACK/NACK may not be avoidable in the aforementioned cases. As a result, when SR may be sent on an sTTI of the sPUCCH 315 and HARQ ACK/NACK of the PUCCH/PUSCH 310 may also be sent on the sTTI of the sPUCCH 315, the UE 115 may determine the sPUCCH 315 resources to use. For instance, the UE 115 may be configured with resources for the transmission of SR and ACK/NACK information to avoid collisions between HARQ feedback for a longer TTI and an SR for an sTTI. In such cases, a particular resource for sPUCCH format 4 (or sPUCCH format 3, depending on the duration of the sTTI) may be configured for combined SR and ACK/NACK transmissions. In other examples, multiple resources may be configured for SR and ACK/NACK transmissions using sPUCCH format 4, and the UE 115 may select one of the multiple resources based on a smallest set of resources that does not exceed a maximum coding rate for the size (e.g., the number of bits) of the ACK/NACK information. Additionally or alternatively, the UE 115 may identify a most recent instance of the sPUCCH format 4 (or sPUCCH format 3) that was indicated to the UE 115. In such cases, the UE 115 may transmit the SR and the ACK/NACK information using resources based on the most recent format indication that was identified.

Figure 4:
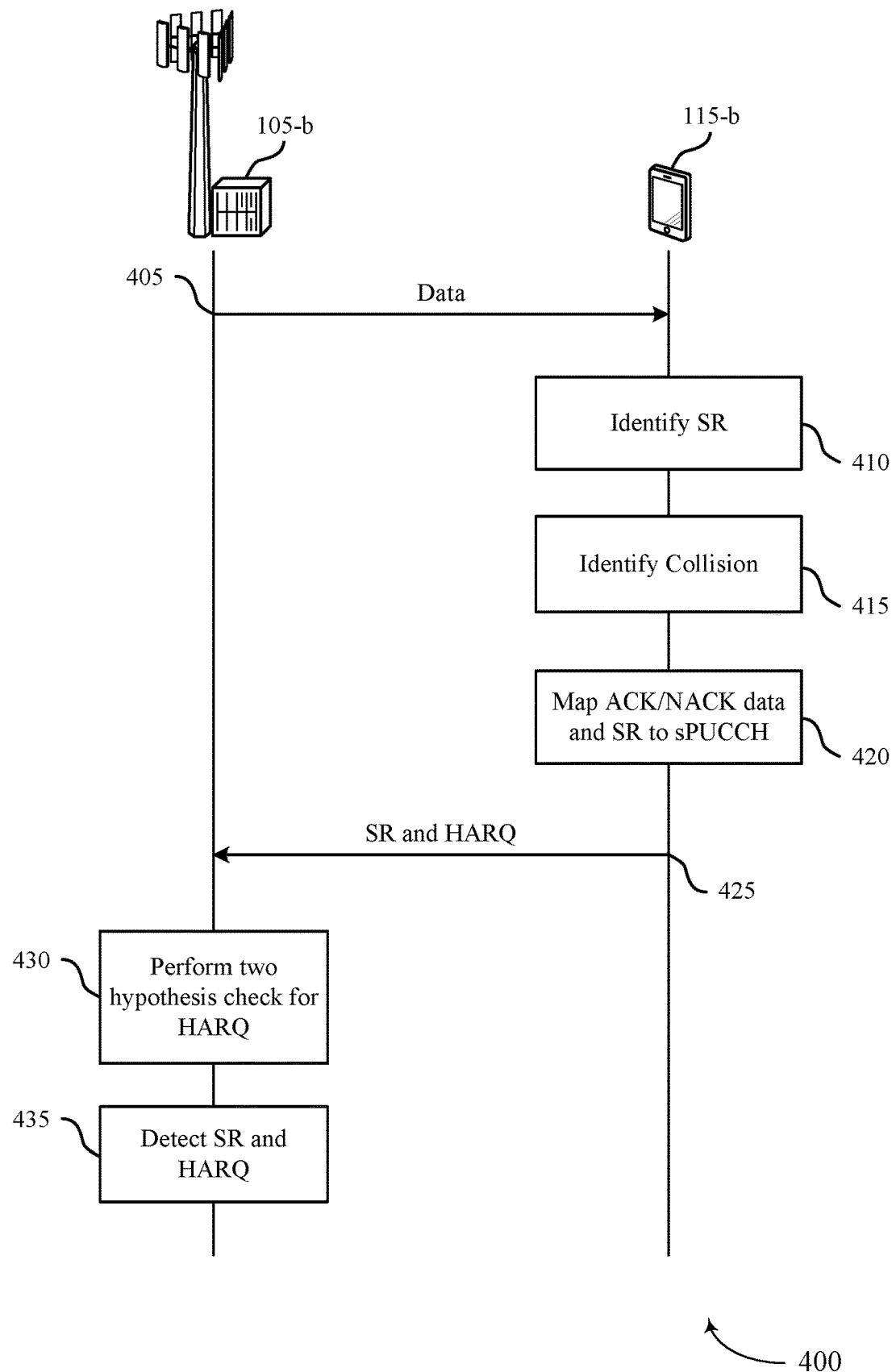
FIG. 4 illustrates an example of a process flow in a system that supports collision avoidance for SRs and UCI in accordance with aspects of the present disclosure.

FIG. 4 illustrates an example of a process flow 400 in a system that supports collision avoidance for SRs and UCI in accordance with aspects of the present disclosure. Process flow 400 includes base station 105-b and UE 115-b, which may be examples of a base station 105 and a UE 115 as described with reference to FIGS. 1 and 2. Process flow 400 may describe techniques for collision avoidance through the coherent selection of sPUCCH resources for the transmission of SR and HARQ feedback.

At 405, base station 105-b may transmit data to UE 115-b. For example, the data may be subject to HARQ feedback from the UE 115-b. At 410, UE 115-b may identify uplink data (e.g., low latency data, or data associated with sTTI transmissions) ready for transmission, and may identify an SR to be transmitted on sPUCCH. The timing of when the UE 115-b detects the SR trigger may impact when and which resources the SR is sent on, as described with reference to timeline 300 of FIG. 3.

At 415, UE 115-b may identify ACK/NACK information to be transmitted on PUCCH (or PUSCH), for example, consisting of HARQ feedback for the data received at 405. UE 115-b may also identify that PUCCH collides with the identified SR to be transmitted on sPUCCH. For example, the PUCCH and sPUCCH are sent on respective TTIs that overlap in time. If simultaneous transmission is not possible by UE 115-b, PUSCH/PUCCH may be stopped, and the HARQ ACK/NACK from the PUSCH/PUCCH may be sent on the sPUCCH. UE 115-b may determine to use sPUCCH format 4 based on the number on HARQ bits to be transmitted with the SR (e.g., when the sPUCCH is sent using a TTI duration of less than a slot). In other cases, and as described herein, sPUCCH 3 may be used based on the number of HARQ bits.

At 420, UE 115-b may determine resources of sPUCCH to be used for transmission of the SR and the ACK/NACK information, and map the PUCCH HARQ bits and the SR to the determined resources of sPUCCH. For example, to avoid collision, the SR and HARQ ACK/NACK on the PUCCH/PUSCH may be mapped on an sTTI of the sPUCCH. UE 115-b may determine the sPUCCH resources to use in this alternative if no downlink grant, DCI, or ARI has been received. In an example, UE 115-b may determine a format of the sPUCCH (e.g., format 3 or format 4) based on a size of the ACK/NACK information, and identifying an SR configuration that indicates one or more resources from the set of resources to be used for transmitting the SR and the ACK/NACK information in accordance with the format. That is, a single sPUCCH resource or multiple sPUCCH resources may be configured for the transmission of SR and the ACK/NACK information. In some cases, the one or more resources may be configured for the format of the sPUCCH based on the duration of the sTTI with which the sPUCCH is to be transmitted. A maximum coding rate may be considered by UE 115-b when mapping HARQ and SR to one or more resource blocks. As such, UE 115-b may select the fewest resource blocks having a coding rate that is below the maximum coding rate. In some examples, the HARQ feedback information may be associated with communications using TTIs having a duration that is greater than the sTTI. That is, there may not be HARQ feedback information for communications using sTTIs, and the HARQ feedback information included with the SR may be for longer TTIs.

In some cases, UE 115-*b* may test for the resources to use based on the maximum coding rate. For instance, UE 115-*b* may identify a coding rate threshold for the resources of the sPUCCH, and may then determine the resources of sPUCCH from the one or more configured resources based on the coding rate threshold, the size of the ACK/NACK information, and a number of CRC bits. In such cases, UE 115-*b* may select, from the one or more resources, a first resource of sPUCCH for transmitting the SR and the ACK/NACK information such that a coding rate of the first resource satisfies the coding rate threshold based on a payload size of the first resource, where the first resource is a smallest resource of the one or more resources. In other examples, UE 115-*b* may determine that the first resource does not satisfy the coding rate threshold based on the payload size of the first resource (e.g., the maximum coding rate was exceeded), and may select a second resource of the sPUCCH such that a coding rate of the second resource satisfies the coding rate threshold. The second resource may be larger than the first resource.

In some cases, such techniques for resource selection for UCI transmissions may be performed even when there is not a collision between SR and legacy ACK/NACK information. For example, UE 115-*b* may receive an indication of a set of control channel resources of an uplink control channel to be used for an uplink control message, identifying the coding rate threshold for the uplink control message, and upon determining a payload size of the uplink control message, may select, from the set of control channel resources, a control channel resource based on the coding rate threshold and the determined payload size of the uplink control message.

Additionally or alternatively, UE 115-*b* may identify a most recent instance of the sPUCCH having the determined format that was indicated to UE 115-*b*, where determining the resources of the sPUCCH to be used for transmission of the SR and the ACK/NACK information may be based on the most recent instance, or the determined format, or a combination thereof.

At 425, UE 115-*b* may transmit, to base station 105-*b*, the SR and ACK/NACK information via the configured resources of sPUCCH. For example, sPUCCH format 3 or 4 may be used when more than two bits of HARQ and SR are to be transmitted. At 430, base station 105-*b* may perform a two hypothesis check for HARQ feedback. For example, base station 105-*b* may check both the PUCCH/PUSCH and sPUCCH for legacy HARQ ACK/NACK since the base station 105-*b* may not know that an SR is being sent. At 435, base station 105-*b* may detect the transmitted SR and HARQ feedback.

Figure 5:
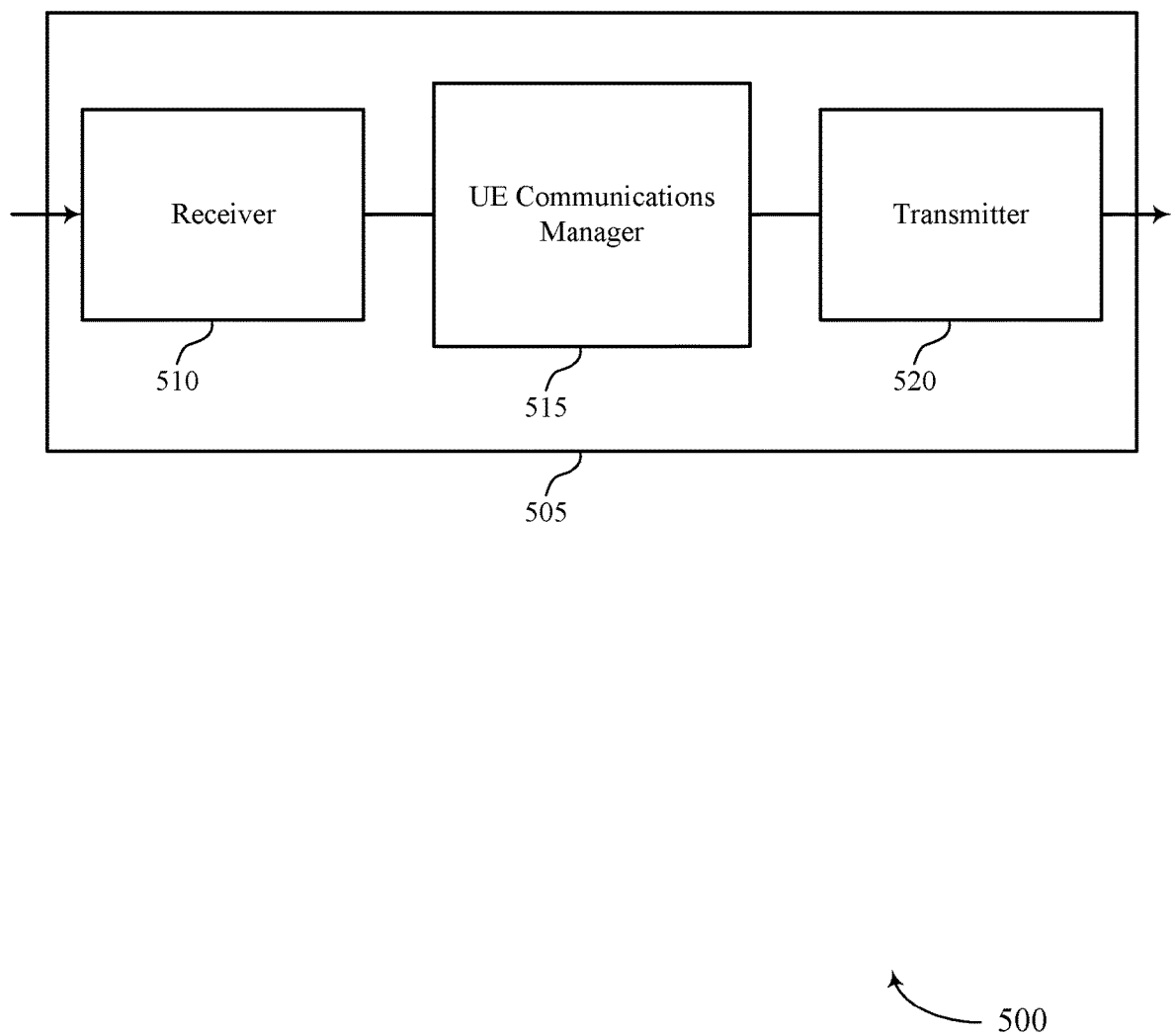
FIGS. 5 through 7 show block diagrams of a device that supports collision avoidance for SRs and UCI in accordance with aspects of the present disclosure.

FIG. 5 shows a block diagram 500 of a wireless device 505 that supports collision avoidance for SRs and UCI in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to collision avoidance for SRs and UCI, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 515 may identify that an SR is to be transmitted on a first uplink control channel message having a first TTI duration and identify that ACK/NACK information is scheduled for transmission on a second uplink control channel message having a second TTI duration that is greater than the first TTI duration, where the first uplink control channel message and the second uplink control channel message overlap in time. In such cases, UE communications manager 515 may determine that the ACK/NACK information is to be transmitted with the SR on the first uplink control channel message based on the first uplink control channel message overlapping with the second uplink control channel message, determine resources of the first uplink control channel message to be used for transmission of the SR and the ACK/NACK information, and transmit the SR and the ACK/NACK information on the determined resources of the first uplink control channel message.

The UE communications manager 515 may also receive an indication of a set of control channel resources of an uplink control channel message to be used for an uplink control message, identify a coding rate threshold for the uplink control message and determine a payload size of the uplink control message. UE communications manager 515 may select, from the set of control channel resources, a control channel resource based on the coding rate threshold and the determined payload size of the uplink control message and transmit the uplink control message to a base station 105 using the selected control channel resource.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
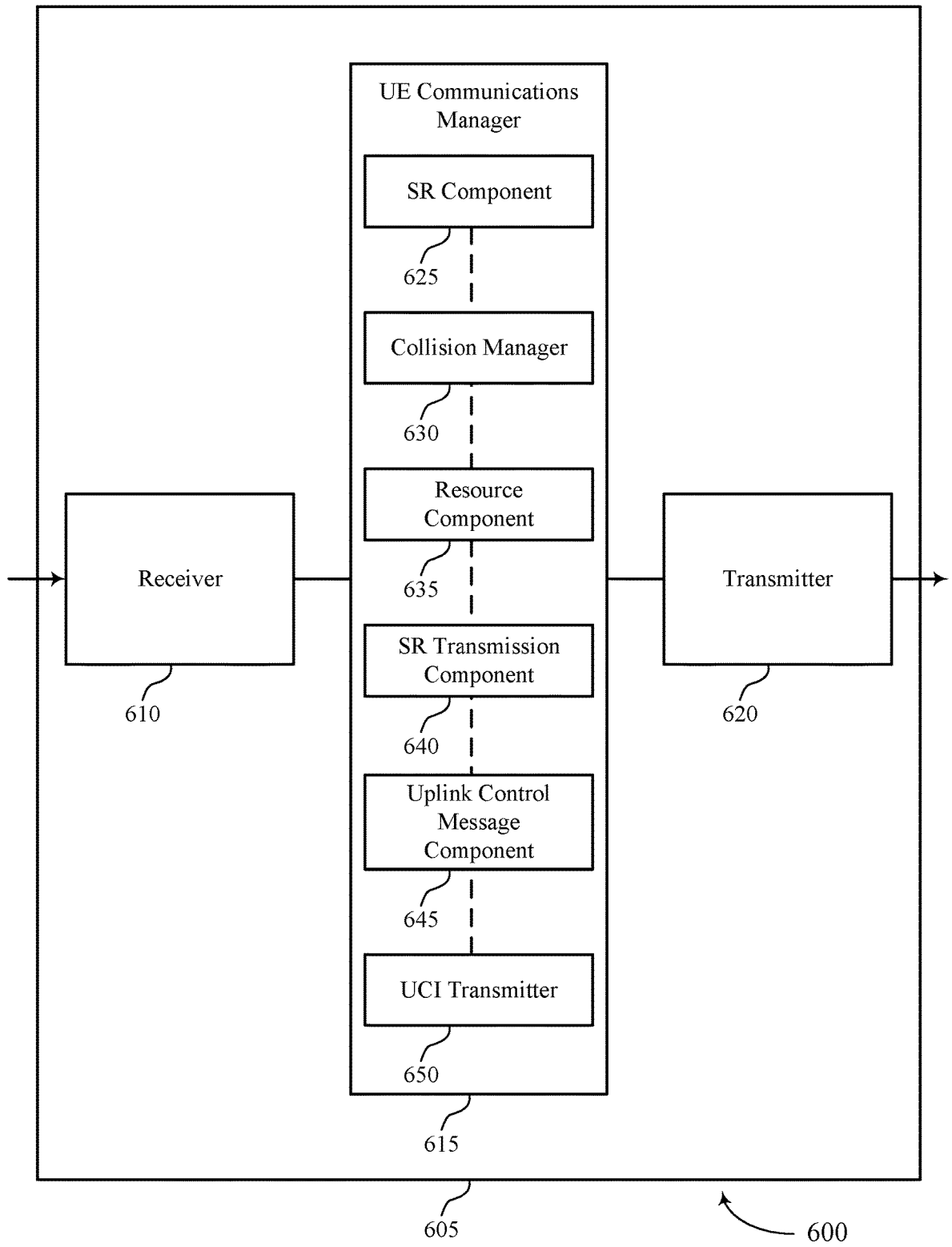

FIG. 6 shows a block diagram 600 of a wireless device 605 that supports collision avoidance for SRs and UCI in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to collision avoidance for SRs and UCI, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include SR component 625, collision manager 630, resource component 635, SR transmission component 640, uplink control message component 645, and UCI transmitter 650.

SR component 625 may identify that an SR is to be transmitted on a first uplink control channel message having a first TTI duration and determine that the ACK/NACK information is to be transmitted with the SR on the first uplink control channel message based on the first uplink control channel message overlapping with a second uplink control channel message.

Collision manager 630 may identify that ACK/NACK information is scheduled for transmission on the second uplink control channel message having a second TTI duration that is greater than the first TTI duration, where the first uplink control channel message and the second uplink control channel message overlap in time. In some examples, collision manager 630 may determine an absence of DCI including an ARI for the first uplink control channel message, where determining the resources of the first uplink control channel message to be used for transmission of the SR and the ACK/NACK information is based on the absence of the DCI. In some cases, collision manager 630 may receive an SR configuration that indicates the SR is to be transmitted on the first uplink control channel message, and determine that a size of the ACK/NACK information is greater than two bits.

Resource component 635 may determine resources of the first uplink control channel message to be used for transmission of the SR and the ACK/NACK information. In some cases, resource component 635 may select, from two or more resources, a first resource for transmitting the SR and the ACK/NACK information such that a coding rate of the first resource satisfies the coding rate threshold based on a payload size of the first resource, where the first resource is a smallest resource of the two or more resources. Additionally or alternatively, resource component 635 may select, from the two or more resources, a first resource for transmitting the SR and the ACK/NACK information, and select, from the two or more resources, a second resource such that a coding rate of the second resource satisfies the coding rate threshold (e.g., when the first resource does not satisfy the coding rate threshold), where the second resource is larger than the first resource. In some cases, determining the resources of the first uplink control channel message includes determining the resources from the two or more resources based on the coding rate threshold, the size of the ACK/NACK information, and a number of CRC bits.

In some examples, resource component 635 may receive an indication of a set of control channel resources of an uplink control channel to be used for an uplink control message. In some cases, resource component 635 may select, from the set of control channel resources, a control channel resource based on the coding rate threshold and the determined payload size of the uplink control message. In some cases, selecting the control channel resource includes selecting the control channel resource such that a coding rate of the control channel resource satisfies the coding rate threshold, where the control channel resource is a smallest resource of the set of control channel resources. Additionally or alternatively, resource component 635 may select, from the set of control channel resources, a second control channel resource such that a coding rate of the second control channel resource satisfies the coding rate threshold, where the second control channel resource is larger than the control channel resource.

In some examples, resource component 635 may receive an indication of which of the set of control channel resources to use for an uplink control message, where the indication is received via an ARI of DCI. Selecting the control channel resource may include selecting the control channel resource based on the coding rate threshold, a size of ACK/NACK information within the uplink control message, and a number of CRC bits for the uplink control message. In some cases, a format of the uplink control channel message is sPUCCH format 4. In some cases, each of the two or more resources are mapped to a number of RBs. In some cases, selecting the control channel resource includes selecting the control channel resource from the set of control channel resources.

SR transmission component 640 may transmit the SR and the ACK/NACK information on the determined resources of the first uplink control channel message. In some cases, SR transmission component may be coupled with a transceiver (e.g., including transmitter 620) and may transmit the SR and the ACK/NACK information in coordination with or using the transceiver. Uplink control message component 645 may identify a coding rate threshold for the uplink control message, determine a payload size of the uplink control message, and determine that the control channel resource does not satisfy the coding rate threshold based on the payload size of the uplink control message. UCI transmitter 650 may transmit the uplink control message to a base station 105 using the selected control channel resource.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
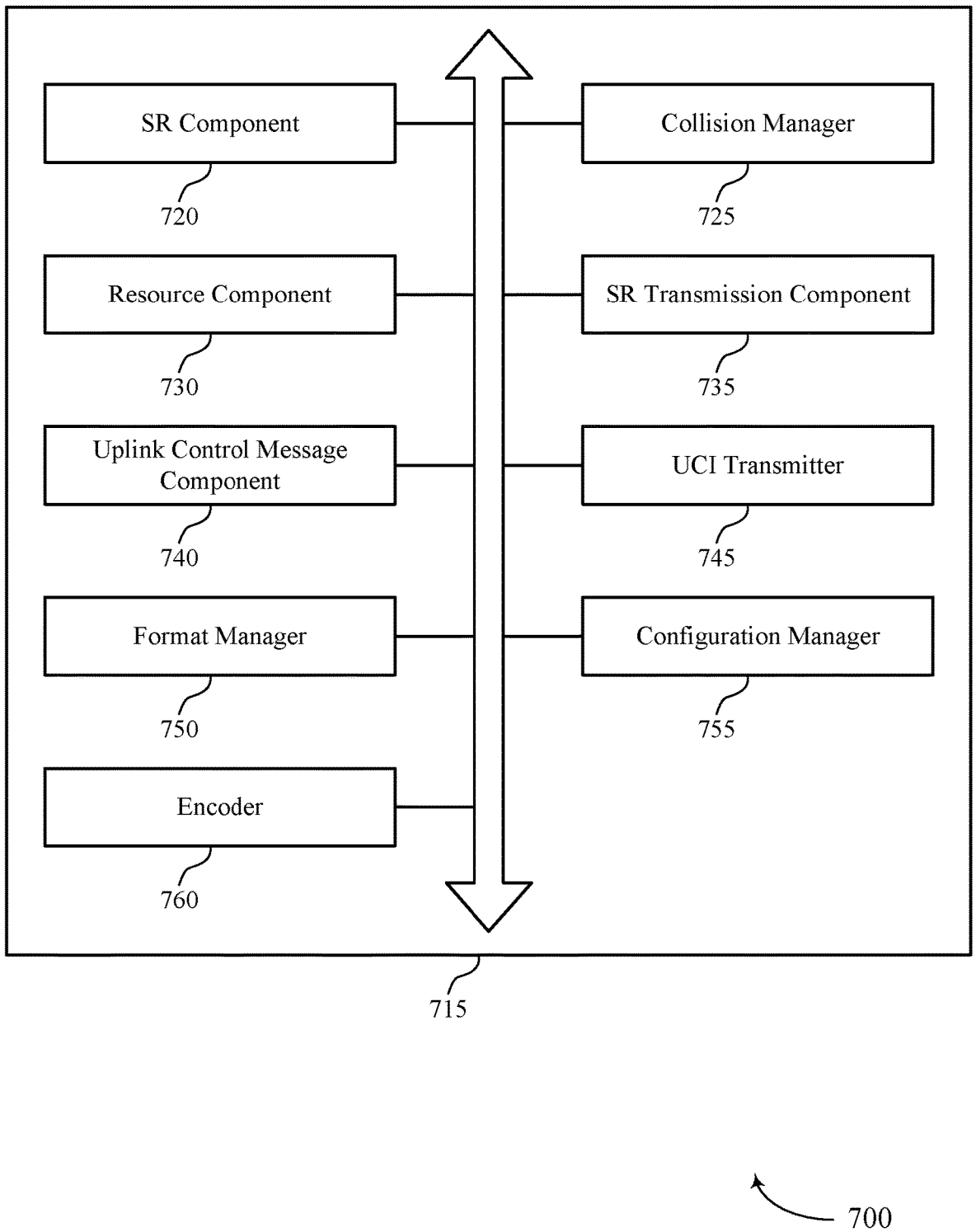

FIG. 7 shows a block diagram 700 of a UE communications manager 715 that supports collision avoidance for SRs and UCI in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include SR component 720, collision manager 725, resource component 730, SR transmission component 735, uplink control message component 740, UCI transmitter 745, format manager 750, configuration manager 755, and encoder 760. Each of these modules may communicate, directly or indirectly, with one another (e.g., via one or more buses).

SR component 720 may identify that an SR is to be transmitted on a first uplink control channel message having a first TTI duration and determine that the ACK/NACK information is to be transmitted with the SR on the first uplink control channel message based on the first uplink control channel message overlapping with the second uplink control channel message.

Collision manager 725 may identify that ACK/NACK information is scheduled for transmission on the second uplink control channel message having a second TTI duration that is greater than the first TTI duration, where the first uplink control channel message and the second uplink control channel message overlap in time. In some examples, collision manager 725 may determine an absence of DCI including an ARI for the first uplink control channel message, where determining the resources of the first uplink control channel message to be used for transmission of the SR and the ACK/NACK information is based on the absence of the DCI. In some cases, collision manager 725 may receive an SR configuration that indicates the SR is to be transmitted on the first uplink control channel message, and determine that a size of the ACK/NACK information is greater than two bits.

Resource component 730 may determine resources of the first uplink control channel message to be used for transmission of the SR and the ACK/NACK information. In some cases, resource component 730 may select, from two or more resources, a first resource for transmitting the SR and the ACK/NACK information such that a coding rate of the first resource satisfies the coding rate threshold based on a payload size of the first resource, where the first resource is a smallest resource of the two or more resources. Additionally or alternatively, resource component 730 may select, from the two or more resources, a first resource for transmitting the SR and the ACK/NACK information, and select, from the two or more resources, a second resource such that a coding rate of the second resource satisfies the coding rate threshold (e.g., when the first resource does not satisfy the coding rate threshold), where the second resource is larger than the first resource. In some cases, determining the resources of the first uplink control channel message includes determining the resources from the two or more resources based on the coding rate threshold, the size of the ACK/NACK information, and a number of CRC bits.

In some examples, resource component 730 may receive an indication of a set of control channel resources of an uplink control channel to be used for an uplink control message. In some cases, resource component 730 may select, from the set of control channel resources, a control channel resource based on the coding rate threshold and the determined payload size of the uplink control message. In some cases, selecting the control channel resource includes selecting the control channel resource such that a coding rate of the control channel resource satisfies the coding rate threshold, where the control channel resource is a smallest resource of the set of control channel resources. Additionally or alternatively, resource component 730 may select, from the set of control channel resources, a second control channel resource such that a coding rate of the second control channel resource satisfies the coding rate threshold, where the second control channel resource is larger than the control channel resource.

In some examples, resource component 730 may receive an indication of which of the set of control channel resources to use for an uplink control message, where the indication is received via an ARI of DCI. Selecting the control channel resource may include selecting the control channel resource based on the coding rate threshold, a size of ACK/NACK information within the uplink control message, and a number of CRC bits for the uplink control message. In some cases, a format of the uplink control channel message is sPUCCH format 4. In some cases, each of the two or more resources are mapped to a number of RBs. In some cases, selecting the control channel resource includes selecting the control channel resource from the set of control channel resources.

SR transmission component 735 may transmit the SR and the ACK/NACK information on the determined resources of the first uplink control channel message. Uplink control message component 740 may identify a coding rate threshold for the uplink control message, determine a payload size of the uplink control message, and determine that the control channel resource does not satisfy the coding rate threshold based on the payload size of the uplink control message. UCI transmitter 745 may transmit the uplink control message to a base station 105 using the selected control channel resource.

Format manager 750 may determine a format of the first uplink control channel message based on a size of the ACK/NACK information, where the format of the first uplink control channel message corresponds to a set of resources. In some examples, format manager 750 may identify a most recent instance of the first uplink control channel message having the determined format that was indicated to the UE 115, where determining the resources of the first uplink control channel message to be used for transmission of the SR and the ACK/NACK information is based on the most recent instance, or the determined format, or a combination thereof. In some cases, determining the format of the first uplink control channel message includes identifying a format configuration for the resources based on the first TTI duration, where the first TTI duration may include a slot or duration less than the slot, and where the format includes sPUCCH format 3 or sPUCCH format 4.

Configuration manager 755 may identify an SR configuration that that indicates first resources from the set of resources for transmitting the SR and the ACK/NACK information in accordance with the format, where the determined resources include the first resources. Additionally or alternatively, configuration manager 755 may identify an SR configuration that indicates two or more resources from the set of resources to be used for transmitting the SR and the ACK/NACK information in accordance with the format, where the determined resources are selected from the two or more resources based on the SR configuration. In some cases, the SR configuration is received via DCI, RRC messaging, or a combination thereof. In some cases, the SR configuration is preconfigured. In some cases, the ACK/NACK information is associated with communications using the second TTI duration.

In some examples, configuration manager 755 may identify the SR configuration from a set of configurations for the transmission of the ACK/NACK information, or the SR, or a combination thereof. For instance, a first configuration from the set of configurations includes an indication of whether the SR is to be transmitted on the first uplink control channel message or the second uplink control channel message (e.g., a channel restriction). Additionally, a second configuration from the set of configurations may indicate whether the transmission of SR is to be deferred (e.g., to a later SR opportunity), and a third configuration from the set of configurations may indicate that the second uplink control channel message may be dropped (e.g., either prior to transmission or while being transmitted based on an SR trigger). In other examples, a fourth configuration from the set of configurations may indicate that the second uplink control channel message and the ACK/NACK information may be dropped (e.g., where only SR is transmitted). Encoder 760 may identify a coding rate threshold for the resources of the first uplink control channel message and determine that the first resource does not satisfy the coding rate threshold based on a payload size of the first resource.

Figure 8:
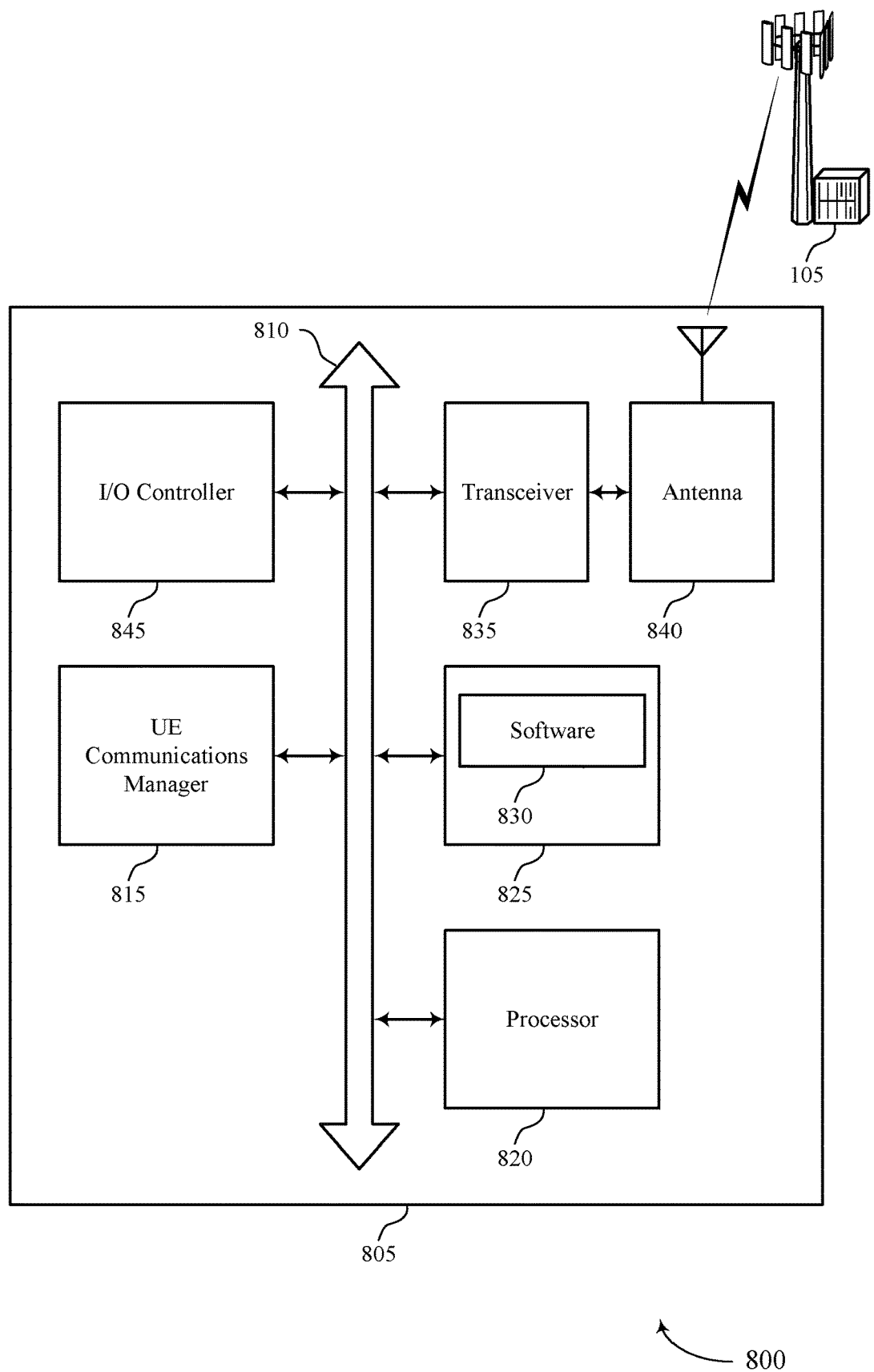
FIG. 8 illustrates a block diagram of a system including a user equipment (UE) that supports collision avoidance for SRs and UCI in accordance with aspects of the present disclosure.

FIG. 8 illustrates a diagram of a system 800 including a device 805 that supports collision avoidance for SRs and UCI in accordance with aspects of the present disclosure. Device 805 may be an example of or include the components of wireless device 505, wireless device 605, or a UE 115 as described herein, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting collision avoidance for SRs and UCI).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support collision avoidance for SRs and UCI. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
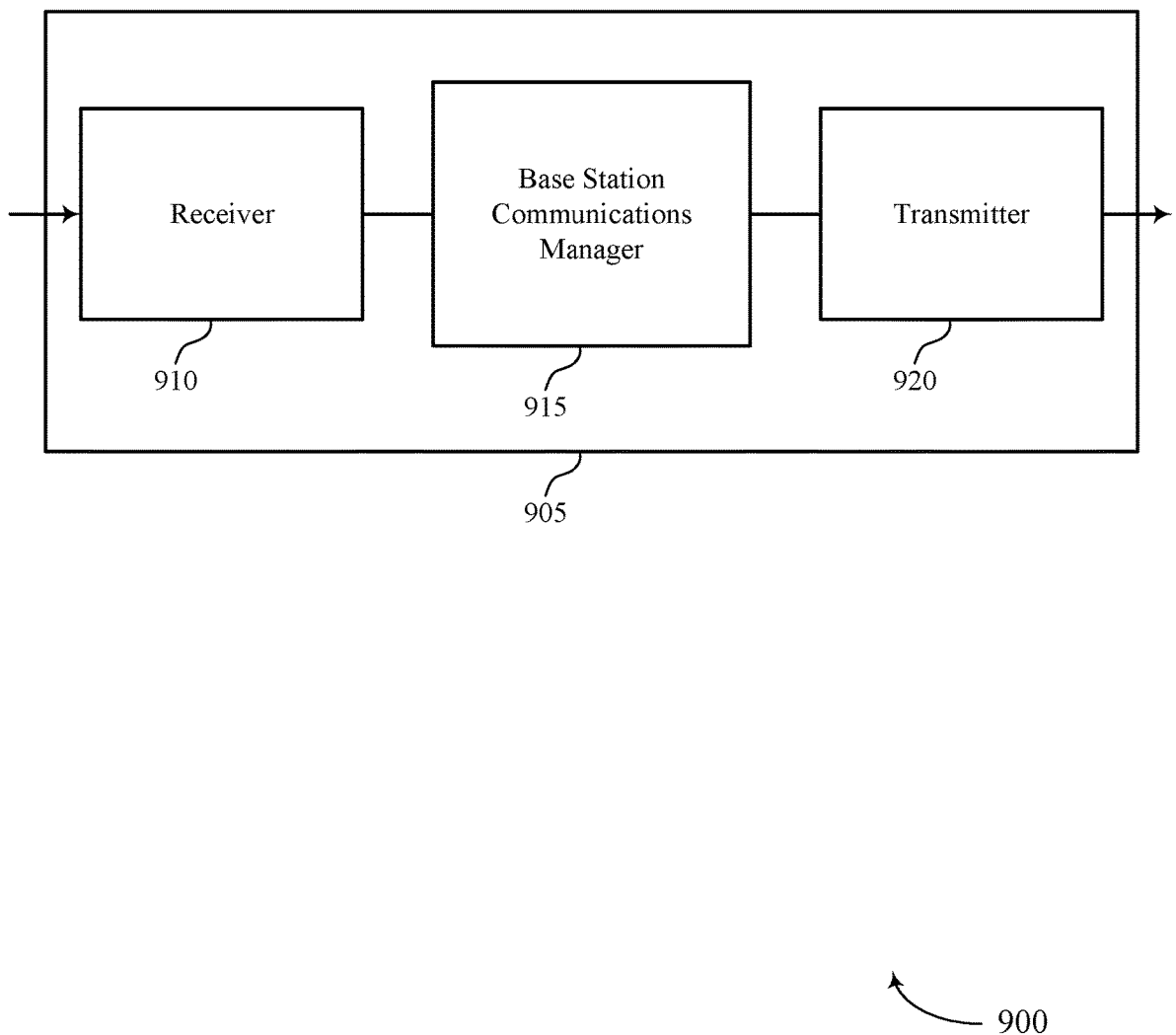
FIGS. 9 through 11 show block diagrams of a device that supports collision avoidance for SRs and UCI in accordance with aspects of the present disclosure.

FIG. 9 shows a block diagram 900 of a wireless device 905 that supports collision avoidance for SRs and UCI in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to collision avoidance for SRs and UCI, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may configure a set of resources of an uplink control channel for the transmission of an uplink control message based on a format and a coding rate threshold of the uplink control message, where the uplink control message has a first TTI duration that is less than a second TTI duration, and transmit, to a UE 115, an indication of the set of resources of the uplink control channel to use for the uplink control message.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
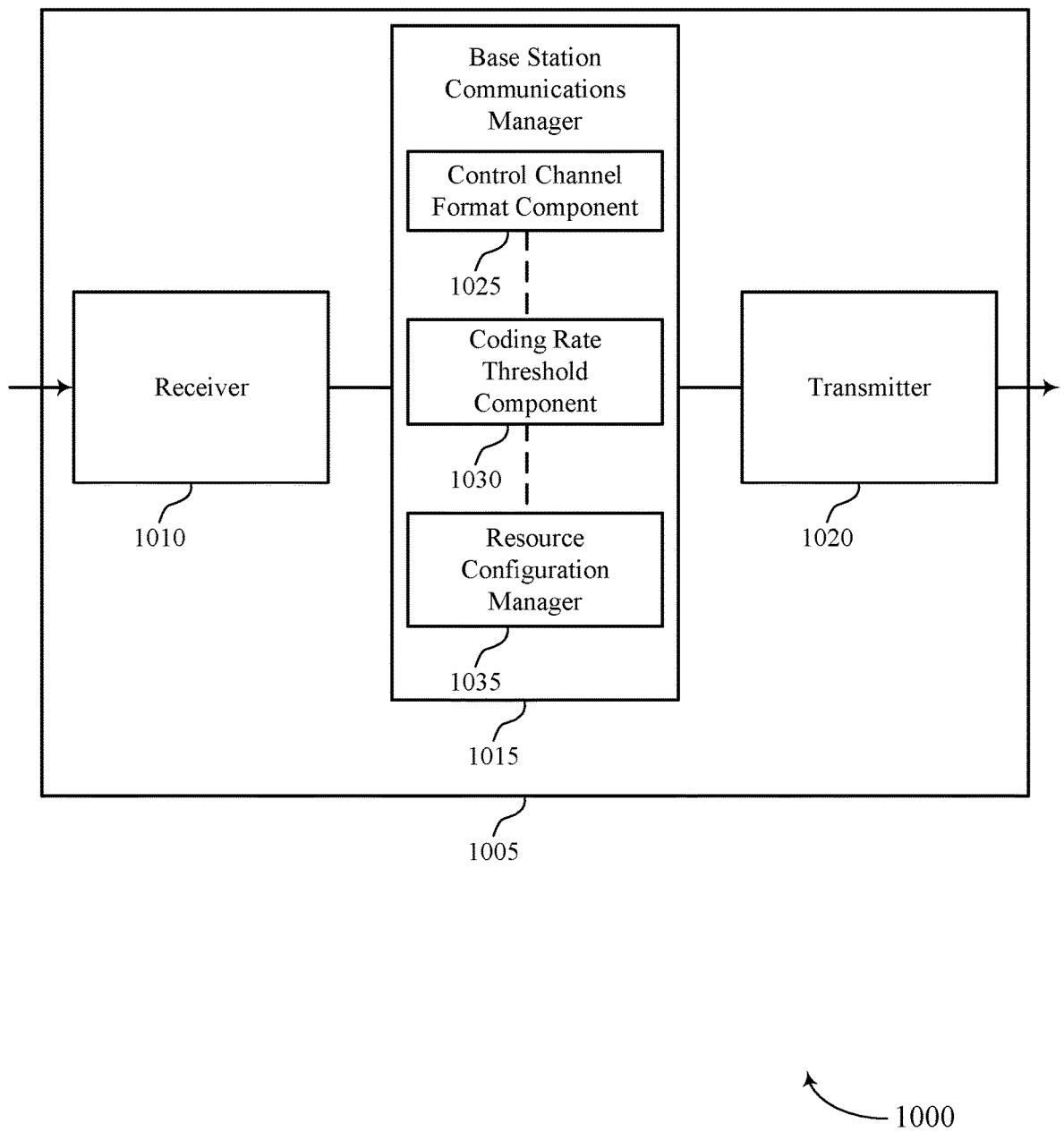

FIG. 10 shows a block diagram 1000 of a wireless device 1005 that supports collision avoidance for SRs and UCI in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to collision avoidance for SRs and UCI, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include control channel format component 1025, coding rate threshold component 1030, and resource configuration manager 1035.

Control channel format component 1025 may identify a format of an uplink control channel message. In some cases, the format includes sPUCCH format 4. Coding rate threshold component 1030 may determine a coding rate threshold for the uplink control message.

Resource configuration manager 1035 may configure a set of resources of an uplink control channel for the transmission of the uplink control message based on a format and a coding rate threshold of the uplink control message, where the uplink control message has a first TTI duration that is less than a second TTI duration. In some cases, resource configuration manager 1035 may transmit, to a UE 115, an indication of the set of resources of the uplink control channel to use for the uplink control message. In some cases, transmitting the indication includes transmitting the indication via an ARI of DCI. In some cases, each of the set of resources are mapped to a number of RBs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
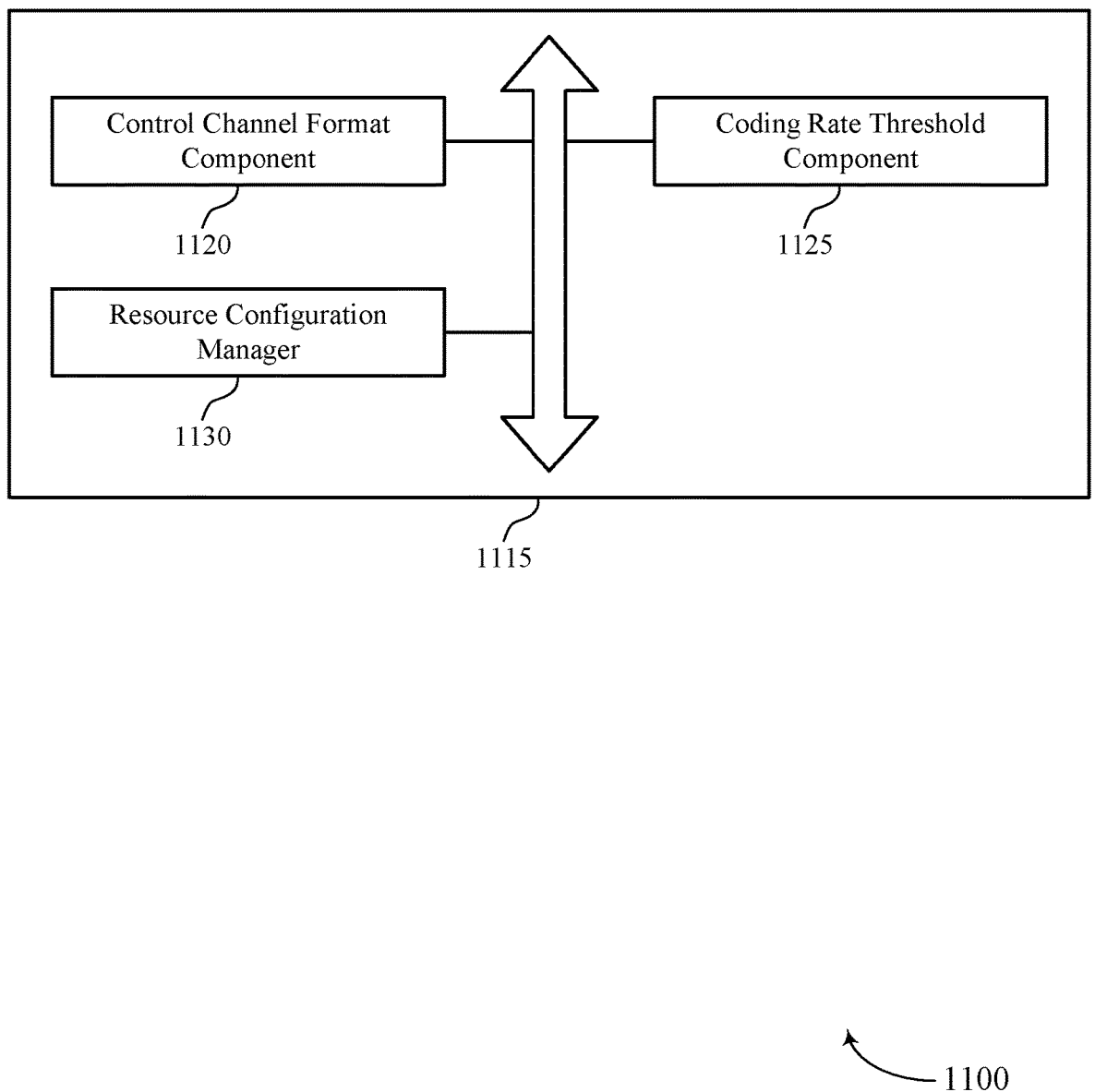

FIG. 11 shows a block diagram 1100 of a base station communications manager 1115 that supports collision avoidance for SRs and UCI in accordance with aspects of the present disclosure. The base station communications manager 1115 may be an example of aspects of a base station communications manager 1215 described with reference to FIGS. 9, 10, and 12. The base station communications manager 1115 may include control channel format component 1120, coding rate threshold component 1125, and resource configuration manager 1130. Each of these modules may communicate, directly or indirectly, with one another (e.g., via one or more buses).

Control channel format component 1120 may identify a format of an uplink control message. In some cases, the format includes sPUCCH format 4. Coding rate threshold component 1125 may determine a coding rate threshold for the uplink control message. Resource configuration manager 1130 may configure a set of resources of an uplink control channel for the transmission of the uplink control message based on the format and the coding rate threshold of the uplink control message, where the uplink control message has a first TTI duration that is less than a second TTI duration. In some examples, resource configuration manager 1130 may transmit, to a UE 115, an indication of the set of resources of the uplink control channel to use for the uplink control message. In some cases, transmitting the indication includes transmitting the indication via an ARI indicator of DCI. In some cases, each of the set of resources are mapped to a number of RBs.

Figure 12:
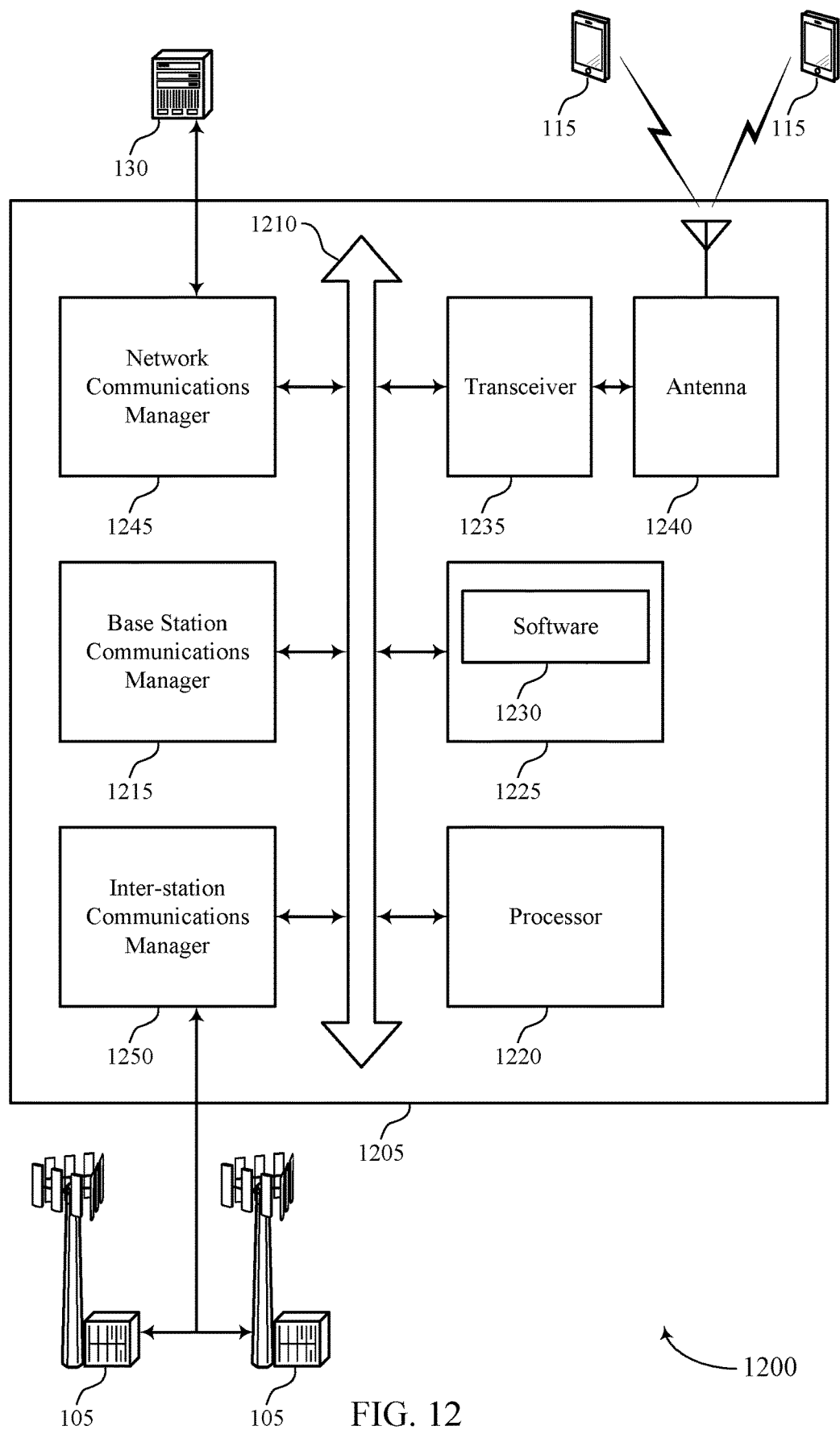
FIG. 12 illustrates a block diagram of a system including a base station that supports collision avoidance for SRs and UCI in accordance with aspects of the present disclosure.

FIG. 12 shows a diagram of a system 1200 including a device 1205 that supports collision avoidance for SRs and UCI in accordance with aspects of the present disclosure. Device 1205 may be an example of or include the components of base station 105 as described herein, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting collision avoidance for SRs and UCI).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support collision avoidance for SRs and UCI. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
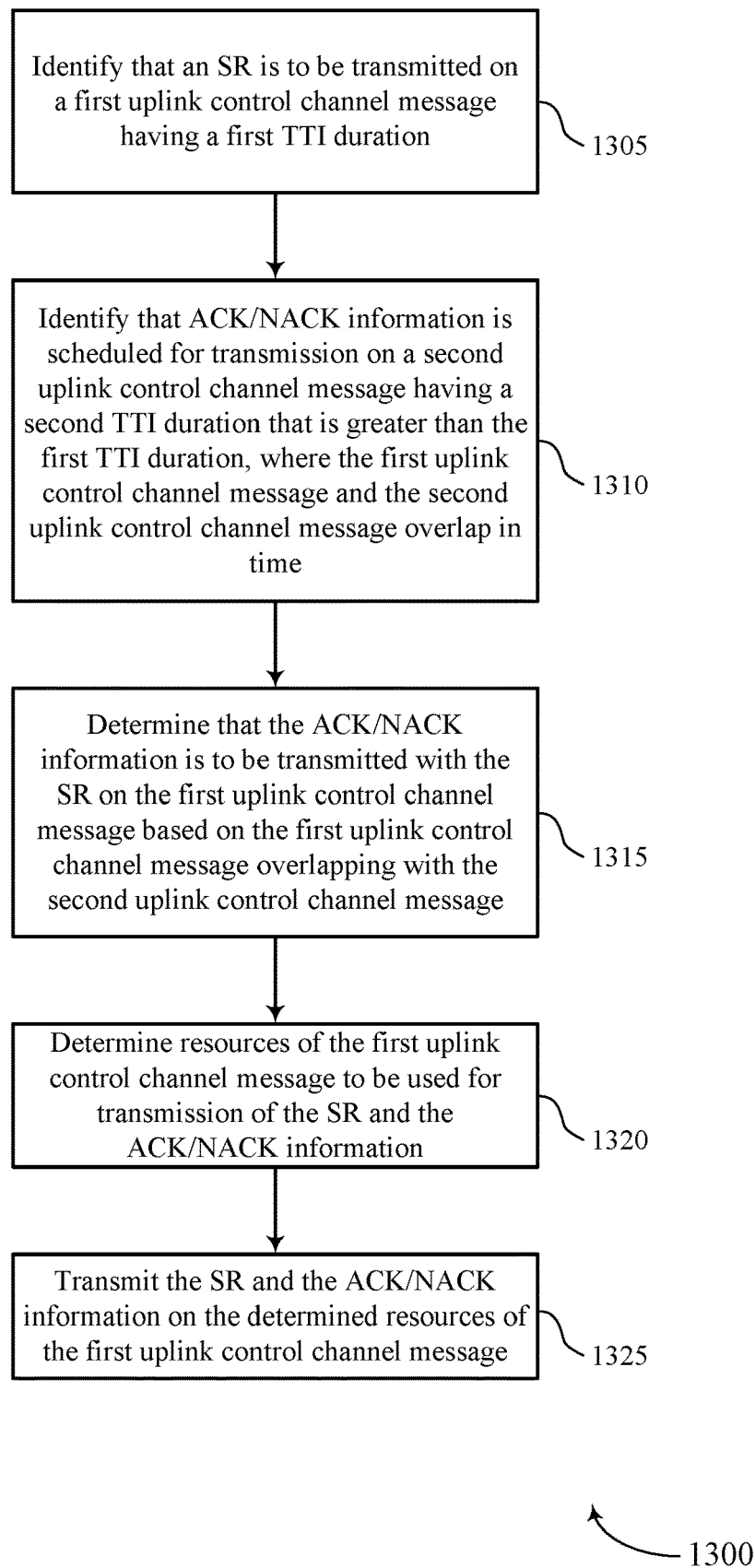
FIGS. 13 through 17 illustrate methods for collision avoidance for SRs and UCI in accordance with aspects of the present disclosure.

FIG. 13 shows a flowchart illustrating a method 1300 for collision avoidance for SRs and UCI in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1305 the UE 115 may identify that an SR is to be transmitted on a first uplink control channel message having a first TTI duration. The operations of 1305 may be performed according to the methods described herein. In certain examples, aspects of the operations of 1305 may be performed by an SR component as described with reference to FIGS. 5 through 8.

At 1310 the UE 115 may identify that ACK/NACK information is scheduled for transmission on a second uplink control channel message having a second TTI duration that is greater than the first TTI duration, where the first uplink control channel message and the second uplink control channel message overlap in time. The operations of 1310 may be performed according to the methods described herein. In certain examples, aspects of the operations of 1310 may be performed by a collision manager as described with reference to FIGS. 5 through 8.

At 1315 the UE 115 may determine that the ACK/NACK information is to be transmitted with the SR on the first uplink control channel message based on the first uplink control channel message overlapping with the second uplink control channel message. The operations of 1315 may be performed according to the methods described herein. In certain examples, aspects of the operations of 1315 may be performed by an SR component as described with reference to FIGS. 5 through 8.

At 1320 the UE 115 may determine resources of the first uplink control channel message to be used for transmission of the SR and the ACK/NACK information. The operations of 1320 may be performed according to the methods described herein. In certain examples, aspects of the operations of 1320 may be performed by a resource component as described with reference to FIGS. 5 through 8.

At 1325 the UE 115 may transmit the SR and the ACK/NACK information on the determined resources of the first uplink control channel message. The operations of 1325 may be performed according to the methods described herein. In certain examples, aspects of the operations of 1325 may be performed by an SR transmission component as described with reference to FIGS. 5 through 8.

Figure 14:
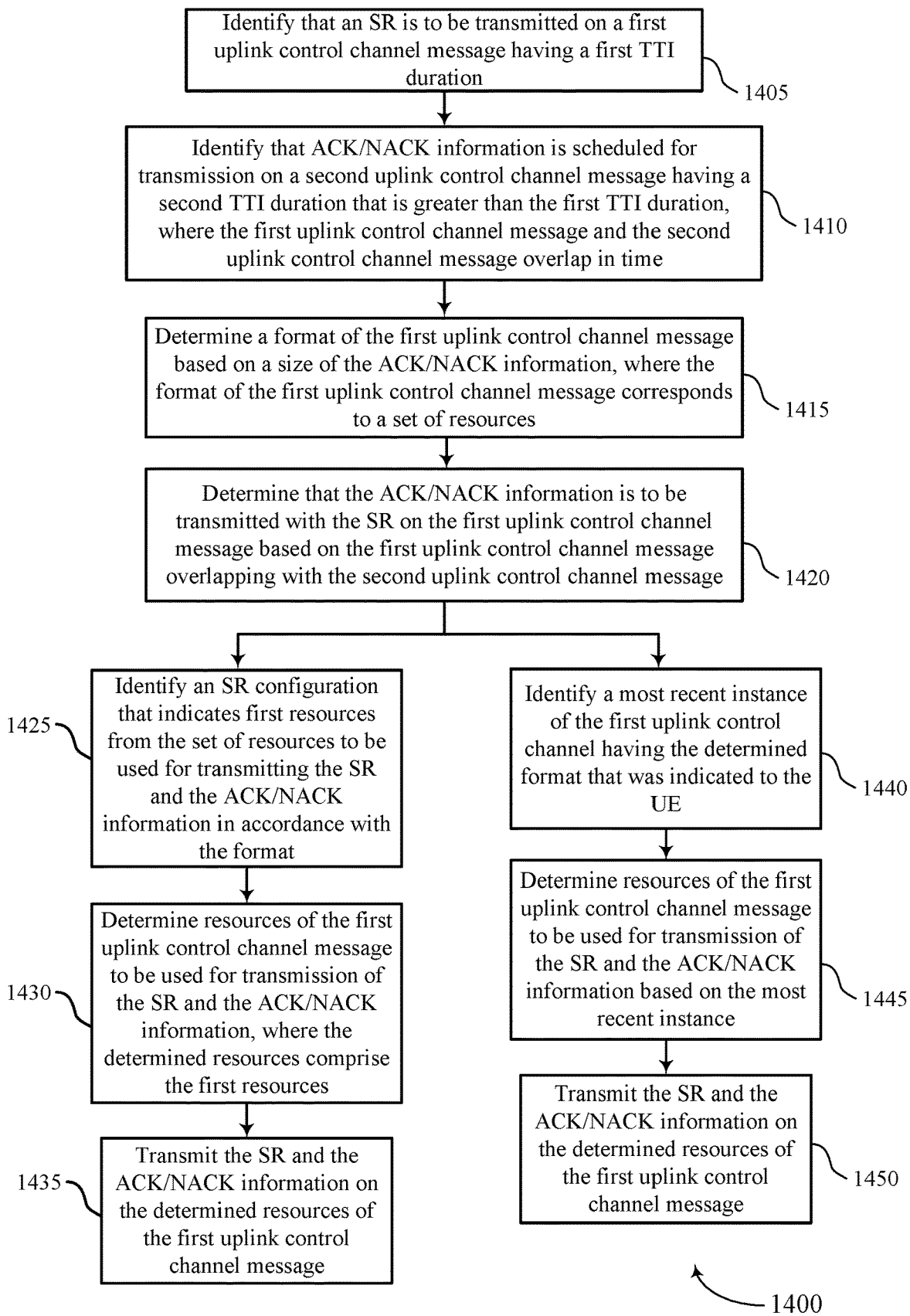

FIG. 14 shows a flowchart illustrating a method 1400 for collision avoidance for SRs and UCI in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may identify that an SR is to be transmitted on a first uplink control channel message having a first TTI duration. The operations of 1405 may be performed according to the methods described herein. In certain examples, aspects of the operations of 1405 may be performed by an SR component as described with reference to FIGS. 5 through 8.

At 1410 the UE 115 may identify that ACK/NACK information is scheduled for transmission on a second uplink control channel message having a second TTI duration that is greater than the first TTI duration, where the first uplink control channel message and the second uplink control channel message overlap in time. The operations of 1410 may be performed according to the methods described herein. In certain examples, aspects of the operations of 1410 may be performed by a collision manager as described with reference to FIGS. 5 through 8.

At 1415 the UE 115 may determine a format of the first uplink control channel message based on a size of the ACK/NACK information, where the format of the first uplink control channel message corresponds to a set of resources. The operations of 1415 may be performed according to the methods described herein. In certain examples, aspects of the operations of 1415 may be performed by a format manager as described with reference to FIGS. 5 through 8.

At 1420 the UE 115 may determine that the ACK/NACK information is to be transmitted with the SR on the first uplink control channel message based on the first uplink control channel message overlapping with the second uplink control channel message. The operations of 1420 may be performed according to the methods described herein. In certain examples, aspects of the operations of 1420 may be performed by an SR component as described with reference to FIGS. 5 through 8.

At 1425 the UE 115 may optionally identify an SR configuration that indicates first resources from the set of resources to be used for transmitting the SR and the ACK/NACK information in accordance with the format. The operations of 1425 may be performed according to the methods described herein. In certain examples, aspects of the operations of 1425 may be performed by a configuration manager as described with reference to FIGS. 5 through 8.

At 1430 the UE 115 may determine resources of the first uplink control channel message to be used for transmission of the SR and the ACK/NACK information, where the determined resources include the first resources. The operations of 1430 may be performed according to the methods described herein. In certain examples, aspects of the operations of 1430 may be performed by a resource component as described with reference to FIGS. 5 through 8.

At 1435 the UE 115 may transmit the SR and the ACK/NACK information on the determined resources of the first uplink control channel message. The operations of 1435 may be performed according to the methods described herein. In certain examples, aspects of the operations of 1435 may be performed by an SR transmission component as described with reference to FIGS. 5 through 8.

In another option, at 1440 the UE 115 may identify a most recent instance of the first uplink control channel message having the determined format that was indicated to the UE 115. The operations of 1440 may be performed according to the methods described herein. In certain examples, aspects of the operations of 1440 may be performed by a format manager as described with reference to FIGS. 5 through 8.

At 1445 the UE 115 may determine resources of the first uplink control channel message to be used for transmission of the SR and the ACK/NACK information based on the most recent instance. The operations of 1445 may be performed according to the methods described herein. In certain examples, aspects of the operations of 1445 may be performed by a resource component as described with reference to FIGS. 5 through 8.

At 1450 the UE 115 may transmit the SR and the ACK/NACK information on the determined resources of the first uplink control channel message. The operations of 1450 may be performed according to the methods described herein. In certain examples, aspects of the operations of 1450 may be performed by an SR transmission component as described with reference to FIGS. 5 through 8.

Figure 15:
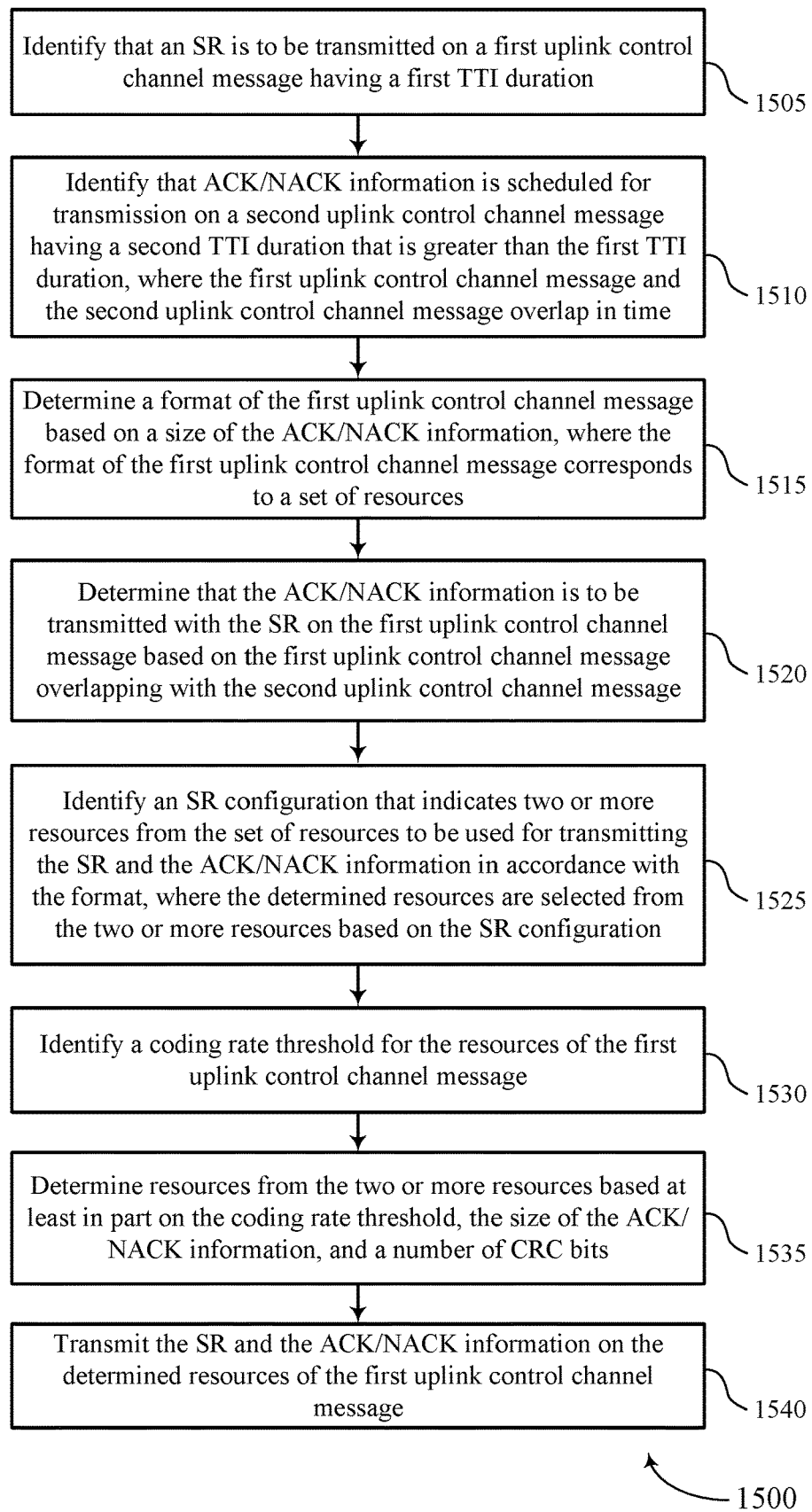

FIG. 15 shows a flowchart illustrating a method 1500 for collision avoidance for SRs and UCI in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may identify that an SR is to be transmitted on a first uplink control channel message having a first TTI duration. The operations of 1505 may be performed according to the methods described herein. In certain examples, aspects of the operations of 1505 may be performed by an SR component as described with reference to FIGS. 5 through 8.

At 1510 the UE 115 may identify that ACK/NACK information is scheduled for transmission on a second uplink control channel message having a second TTI duration that is greater than the first TTI duration, where the first uplink control channel message and the second uplink control channel message overlap in time. The operations of 1510 may be performed according to the methods described herein. In certain examples, aspects of the operations of 1510 may be performed by a collision manager as described with reference to FIGS. 5 through 8.

At 1515 the UE 115 may determine a format of the first uplink control channel message based on a size of the ACK/NACK information, where the format of the first uplink control channel message corresponds to a set of resources. The operations of 1515 may be performed according to the methods described herein. In certain examples, aspects of the operations of 1515 may be performed by a format manager as described with reference to FIGS. 5 through 8.

At 1520 the UE 115 may determine that the ACK/NACK information is to be transmitted with the SR on the first uplink control channel message based on the first uplink control channel message overlapping with the second uplink control channel message. The operations of 1520 may be performed according to the methods described herein. In certain examples, aspects of the operations of 1520 may be performed by an SR component as described with reference to FIGS. 5 through 8.

At 1525 the UE 115 may identify an SR configuration that indicates two or more resources from the set of resources to be used for transmitting the SR and the ACK/NACK information in accordance with the format, where the determined resources are selected from the two or more resources based on the SR configuration. The operations of 1525 may be performed according to the methods described herein. In certain examples, aspects of the operations of 1525 may be performed by a configuration manager as described with reference to FIGS. 5 through 8.

At 1530 the UE 115 may identify a coding rate threshold for the resources of the first uplink control channel message. The operations of 1530 may be performed according to the methods described herein. In certain examples, aspects of the operations of 1530 may be performed by an encoder as described with reference to FIGS. 5 through 8.

At 1535 the UE 115 may determine resources of the first uplink control channel message to be used for transmission of the SR and the ACK/NACK information. In some cases, determining the resources of the first uplink control channel message includes determining the resources from the two or more resources based on the coding rate threshold, the size of the ACK/NACK information, and a number of CRC bits. The operations of 1535 may be performed according to the methods described herein. In certain examples, aspects of the operations of 1535 may be performed by a resource component as described with reference to FIGS. 5 through 8.

At 1540 the UE 115 may transmit the SR and the ACK/NACK information on the determined resources of the first uplink control channel message. The operations of 1540 may be performed according to the methods described herein. In certain examples, aspects of the operations of 1540 may be performed by an SR transmission component as described with reference to FIGS. 5 through 8.

Figure 16:
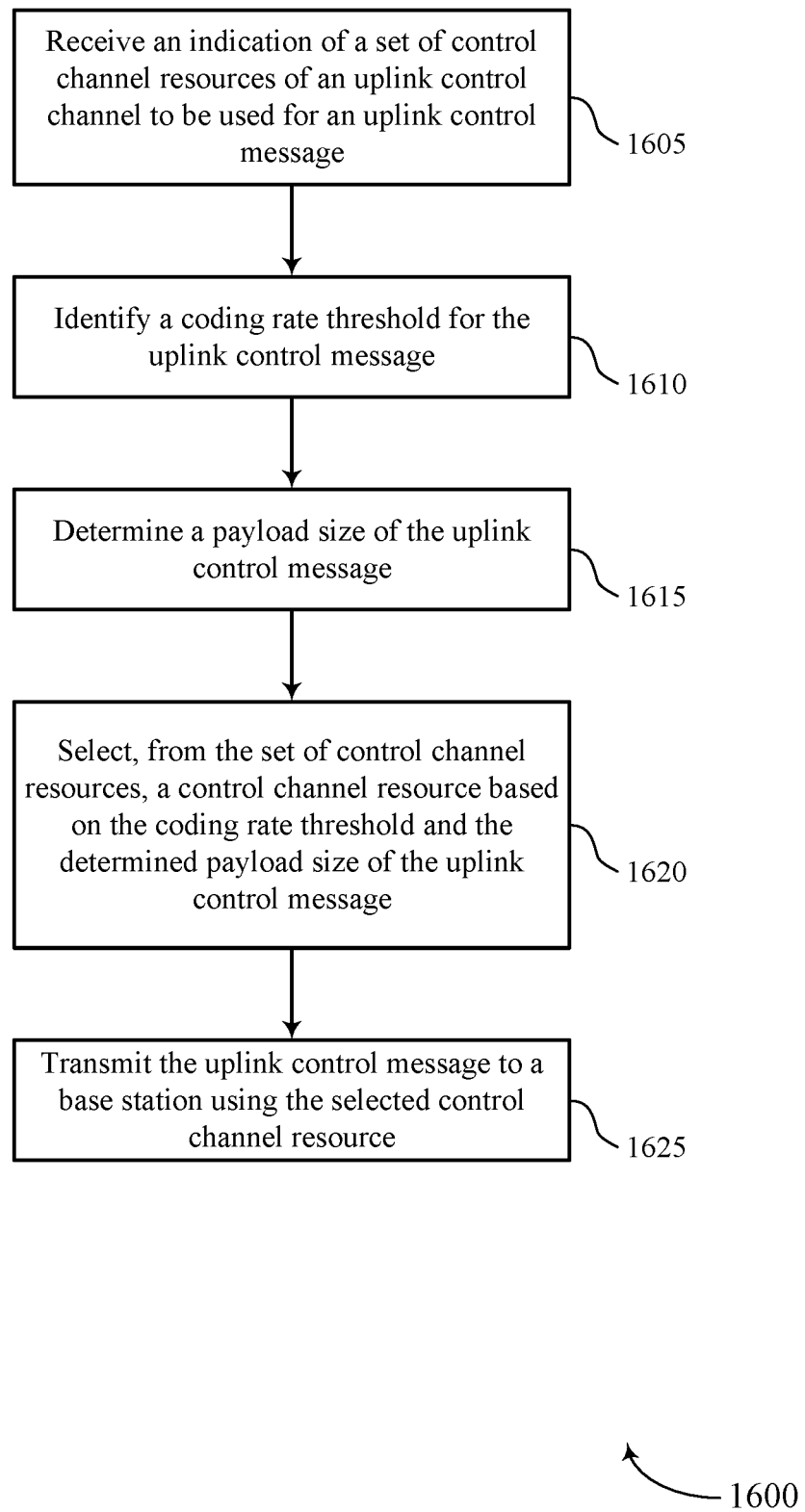

FIG. 16 shows a flowchart illustrating a method 1600 for collision avoidance for SRs and UCI in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive an indication of a set of control channel resources of an uplink control channel to be used for an uplink control message. The operations of 1605 may be performed according to the methods described herein. In certain examples, aspects of the operations of 1605 may be performed by a resource component as described with reference to FIGS. 5 through 8.

At 1610 the UE 115 may identify a coding rate threshold for the uplink control message. The operations of 1610 may be performed according to the methods described herein. In certain examples, aspects of the operations of 1610 may be performed by an uplink control message component as described with reference to FIGS. 5 through 8.

At 1615 the UE 115 may determine a payload size of the uplink control message. The operations of 1615 may be performed according to the methods described herein. In certain examples, aspects of the operations of 1615 may be performed by an uplink control message component as described with reference to FIGS. 5 through 8.

At 1620 the UE 115 may select, from the set of control channel resources, a control channel resource based on the coding rate threshold and the determined payload size of the uplink control message. The operations of 1620 may be performed according to the methods described herein. In certain examples, aspects of the operations of 1620 may be performed by a resource component as described with reference to FIGS. 5 through 8.

At 1625 the UE 115 may transmit the uplink control message to a base station 105 using the selected control channel resource. The operations of 1625 may be performed according to the methods described herein. In certain examples, aspects of the operations of 1625 may be performed by a UCI transmitter as described with reference to FIGS. 5 through 8.

Figure 17:
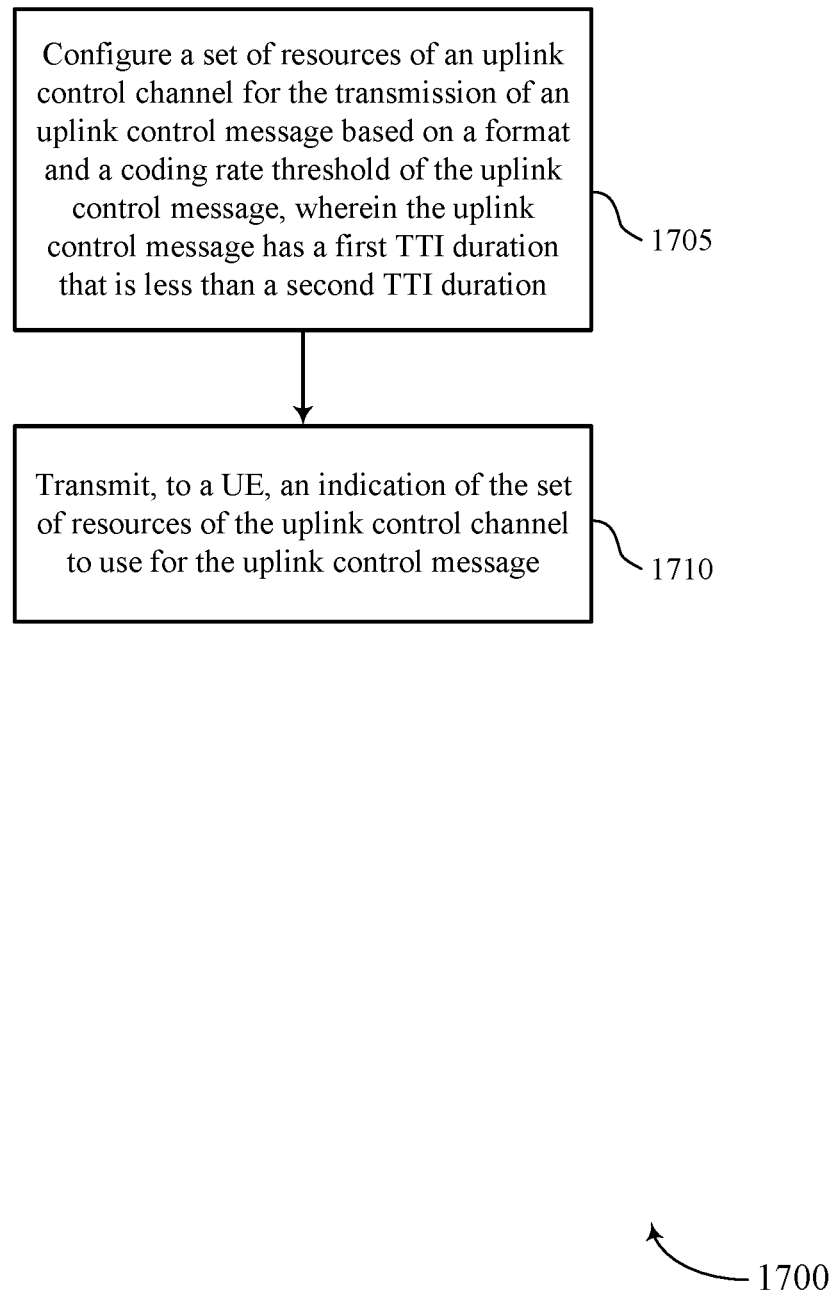

FIG. 17 shows a flowchart illustrating a method 1700 for collision avoidance for SRs and UCI in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may configure a set of resources of an uplink control channel for the transmission of an uplink control message based on a format and a coding rate threshold of the uplink control message, where the uplink control message has a first TTI duration that is less than a second TTI duration. The operations of 1705 may be performed according to the methods described herein. In certain examples, aspects of the operations of 1705 may be performed by a resource configuration manager as described with reference to FIGS. 9 through 12.

At 1710 the base station 105 may transmit, to a user equipment (UE), an indication of the set of resources of the uplink control channel to use for the uplink control message. The operations of 1710 may be performed according to the methods described herein. In certain examples, aspects of the operations of 1710 may be performed by a resource configuration manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that a scheduling request (SR) is to be transmitted on a first uplink control channel message having a first transmission time interval (TTI) duration;
   identifying that acknowledgment/negative acknowledgment (ACK/NACK) information is scheduled for transmission on a second uplink control channel message having a second TTI duration that is greater than the first TTI duration, wherein the first uplink control channel message and the second uplink control channel message overlap in time;

determining that the ACK/NACK information is to be transmitted with the SR on the first uplink control channel message based at least in part on the first uplink control channel message overlapping with the second uplink control channel message;

dropping the second uplink control channel message based at least in part on determining that the ACK/NACK information is to be transmitted with the SR on the first uplink control channel message;

determining resources of the first uplink control channel message to be used for transmission of the SR and the ACK/NACK information; and transmitting the SR and the ACK/NACK information on the determined resources of the first uplink control channel message.

2. The method of claim 1, further comprising:
determining a format of the first uplink control channel message based at least in part on a size of the ACK/NACK information, wherein the format of the first uplink control channel message corresponds to a plurality of resources; and identifying an SR configuration that indicates first resources from the plurality of resources for transmitting the SR and the ACK/NACK information in accordance with the format, wherein the determined resources comprise the first resources.

3. The method of claim 2, wherein the ACK/NACK information is associated with communications using the second TTI duration.

4. The method of claim 2, wherein determining the format of the first uplink control channel message comprises:
identifying the format based at least in part on the first TTI duration, wherein the first TTI duration comprises one of a slot or a duration less than the slot, and wherein the format comprises a short physical uplink control channel (sPUCCH) format 3 or an sPUCCH format 4.

5. The method of claim 2, wherein identifying the SR configuration comprises:
identifying the SR configuration from a set of configurations for the transmission of the ACK/NACK information, or the SR, or a combination thereof.

6. The method of claim 5, wherein a first configuration from the set of configurations comprises an indication of whether the SR is to be transmitted on the first uplink control channel message or the second uplink control channel message.

7. The method of claim 5, wherein a second configuration from the set of configurations indicates whether the transmission of SR is to be deferred.

8. The method of claim 5, wherein a third configuration from the set of configurations indicates that the second uplink control channel message is to be dropped.

9. The method of claim 5, wherein a fourth configuration from the set of configurations indicates that the second uplink control channel message and the ACK/NACK information is to be dropped.

10. The method of claim 2, wherein the SR configuration is received via downlink control information (DCI), radio resource control (RRC) messaging, or a combination thereof.

11. The method of claim 2, wherein the SR configuration is preconfigured.

12. The method of claim 1, further comprising:
determining that a size of the ACK/NACK information is greater than two bits.

13. The method of claim 1, further comprising:
determining a format of the first uplink control channel message based at least in part on a size of the ACK/NACK information, wherein the format of the first uplink control channel message corresponds to a plurality of resources; and identifying an SR configuration that indicates two or more resources from the plurality of resources to be used for transmitting the SR and the ACK/NACK information in accordance with the format, wherein the determined resources are selected from the two or more resources based on the SR configuration.

14. The method of claim 13, further comprising:
identifying a coding rate threshold for the resources of the first uplink control channel message, wherein determining the resources of the first uplink control channel message comprises:
determining the resources from the two or more resources based at least in part on the coding rate threshold, the size of the ACK/NACK information, and a number of cyclic redundancy check (CRC) bits.

15. The method of claim 14, further comprising:
selecting, from the two or more resources, a first resource for transmitting the SR and the ACK/NACK information such that a coding rate of the first resource satisfies the coding rate threshold based on a payload size of the first resource, wherein the first resource is a smallest resource of the two or more resources.

16. The method of claim 14, further comprising:
selecting, from the two or more resources, a first resource for transmitting the SR and the ACK/NACK information;

determining that the first resource does not satisfy the coding rate threshold based on a payload size of the first resource; and selecting, from the two or more resources, a second resource such that a coding rate of the second resource satisfies the coding rate threshold, wherein the second resource is larger than the first resource.

17. The method of claim 16, wherein each of the two or more resources are mapped to a number of resource blocks (RBs).

18. The method of claim 16, wherein determining the format of the first uplink control channel message comprises:
identifying the format based at least in part on the first TTI duration, wherein the first TTI duration comprises one of a slot or a duration less than the slot, and wherein the format comprises a short physical uplink control channel (sPUCCH) format 3 or an sPUCCH format 4.

19. The method of claim 1, further comprising:
determining a format of the first uplink control channel message based at least in part on a size of the ACK/NACK information, wherein the format of the first uplink control channel message corresponds to a plurality of resources; and identifying a most recent instance of the first uplink control channel message having the determined format that was indicated to the UE, wherein determining the resources of the first uplink control channel message to be used for transmission of the SR and the ACK/NACK information is based at least in part on the most recent instance, or the determined format, or a combination thereof.

20. The method of claim 19, wherein determining the format of the first uplink control channel message comprises:
identifying a format configuration for the resources based at least in part on the first TTI duration, the first TTI duration comprising a slot or duration less than the slot, and wherein the format comprises a short physical uplink control channel (sPUCCH) format 3 or an sPUCCH format 4.

21. The method of claim 1, further comprising:
determining an absence of downlink control information (DCI) comprising an ACK/NACK resource indicator (ARI) for the first uplink control channel message, wherein determining the resources of the first uplink control channel message to be used for transmission of the SR and the ACK/NACK information is based on the absence of the DCI.

22. The method of claim 1, further comprising:
receiving an SR configuration that indicates the SR is to be transmitted on the first uplink control channel message.

23. An apparatus for wireless communication, comprising:
means for identifying that a scheduling request (SR) is to be transmitted on a first uplink control channel message having a first transmission time interval (TTI) duration;
means for identifying that acknowledgment/negative acknowledgment (ACK/NACK) information is scheduled for transmission on a second uplink control channel message having a second TTI duration that is greater than the first TTI duration, wherein the first uplink control channel message and the second uplink control channel message overlap in time;
means for determining that the ACK/NACK information is to be transmitted with the SR on the first uplink control channel message based at least in part on the first uplink control channel message overlapping with the second uplink control channel message;
means for dropping the second uplink control channel message based at least in part on determining that the ACK/NACK information is to be transmitted on the first uplink control channel message;
means for determining resources of the first uplink control channel message to be used for transmission of the SR and the ACK/NACK information; and
means for transmitting the SR and the ACK/NACK information on the determined resources of the first uplink control channel message.

24. An apparatus for wireless communication, comprising:
a processor;
memory in electronic communication with the processor; and
instructions stored in the memory and executable by the processor to cause the apparatus to:
identify that a scheduling request (SR) is to be transmitted on a first uplink control channel message having a first transmission time interval (TTI) duration;
identify that acknowledgment/negative acknowledgment (ACK/NACK) information is scheduled for transmission on a second uplink control channel message having a second TTI duration that is greater than the first TTI duration, wherein the first uplink control channel message and the second uplink control channel message overlap in time;
determine that the ACK/NACK information is to be transmitted with the SR on the first uplink control channel message based at least in part on the first uplink control channel message overlapping with the second uplink control channel message;
drop the second uplink control channel message based at least in part on determining that the ACK/NACK information is to be transmitted on the first uplink control channel message;
determine resources of the first uplink control channel message to be used for transmission of the SR and the ACK/NACK information; and
transmit the SR and the ACK/NACK information on the determined resources of the first uplink control channel message.

25. The apparatus of claim 24, wherein the instructions are further executable by the processor to cause the apparatus to:
determine a format of the first uplink control channel message based at least in part on a size of the ACK/NACK information, wherein the format of the first uplink control channel message corresponds to a plurality of resources; and
identify an SR configuration that indicates first resources from the plurality of resources to be used for transmitting the SR and the ACK/NACK information in accordance with the format, wherein the determined resources comprise the first resources.

26. The apparatus of claim 25, wherein the instructions to determine the format of the first uplink control channel message are executable by the processor to cause the apparatus to:
identify the format based at least in part on the first TTI duration, wherein the first TTI duration comprises one of a slot or a duration less than the slot, and wherein the format comprises a short physical uplink control channel (sPUCCH) format 3 or an sPUCCH format 4.

27. The apparatus of claim 25, wherein the instructions to identify the SR configuration are executable by the processor to cause the apparatus to:
identify the SR configuration from a set of configurations for the transmission of the ACK/NACK information, or the SR, or a combination thereof.

28. The apparatus of claim 27, wherein a first configuration from the set of configurations comprises an indication of whether the SR is to be transmitted on the first uplink control channel message or the second uplink control channel message.

29. The apparatus of claim 27, wherein a second configuration from the set of configurations indicates whether the transmission of SR is to be deferred.

30. The apparatus of claim 27, wherein a third configuration from the set of configurations indicates that the second uplink control channel message is to be dropped.

31. The apparatus of claim 27, wherein a fourth configuration from the set of configurations indicates that the second uplink control channel message and the ACK/NACK information is to be dropped.

32. The apparatus of claim 25, wherein the SR configuration is received via downlink control information (DCI), radio resource control (RRC) messaging, or a combination thereof.

33. The apparatus of claim 25, wherein the SR configuration is preconfigured.

34. The apparatus of claim 24, wherein the instructions are further executable by the processor to cause the apparatus to:

determine that a size of the ACK/NACK information is greater than two bits.

35. The apparatus of claim 24, wherein the instructions are further executable by the processor to cause the apparatus to:
   determine a format of the first uplink control channel message based at least in part on a size of the ACK/NACK information, wherein the format of the first uplink control channel message corresponds to a plurality of resources; and
   identify an SR configuration that indicates two or more resources from the plurality of resources to be used for transmitting the SR and the ACK/NACK information in accordance with the format, wherein the determined resources are selected from the two or more resources based on the SR configuration.

36. The apparatus of claim 35, wherein the instructions are further executable by the processor to cause the apparatus to:
   identify a coding rate threshold for the resources of the first uplink control channel message, wherein the instruction to determine the resources of the first uplink control channel message are executable by the processor to cause the apparatus to:
      determine the resources from the two or more resources based at least in part on the coding rate threshold, the size of the ACK/NACK information, and a number of cyclic redundancy check (CRC) bits.

37. The apparatus of claim 36, wherein the instructions are further executable by the processor to cause the apparatus to:
   select, from the two or more resources, a first resource for transmitting the SR and the ACK/NACK information such that a coding rate of the first resource satisfies the coding rate threshold based on a payload size of the first resource, wherein the first resource is a smallest resource of the two or more resources.

38. The apparatus of claim 36, wherein the instructions are further executable by the processor to cause the apparatus to:
   select, from the two or more resources, a first resource for transmitting the SR and the ACK/NACK information;
   determine that the first resource does not satisfy the coding rate threshold based on a payload size of the first resource; and
   select, from the two or more resources, a second resource such that a coding rate of the second resource satisfies the coding rate threshold, wherein the second resource is larger than the first resource.

39. The apparatus of claim 35, wherein each of the two or more resources are mapped to a number of resource blocks (RBs).

40. The apparatus of claim 35, wherein the instructions to determine the format of the first uplink control channel message are executable by the processor to cause the apparatus to:
   identify the format based at least in part on the first TTI duration, wherein the first TTI duration comprises one of a slot or a duration less than the slot, and wherein the format comprises a short physical uplink control channel (sPUCCH) format 3 or an sPUCCH format 4.

41. The apparatus of claim 24, wherein the instructions are further executable by the processor to cause the apparatus to:
   determine a format of the first uplink control channel message based at least in part on a size of the ACK/NACK information, wherein the format of the first uplink control channel message corresponds to a plurality of resources; and
   identify a most recent instance of the first uplink control channel message having the determined format that was indicated to the UE, wherein determining the resources of the first uplink control channel message to be used for transmission of the SR and the ACK/NACK information is based at least in part on the most recent instance, or the determined format, or a combination thereof.

42. The apparatus of claim 41, wherein the instructions to determine the format of the first uplink control channel message are executable by the processor to cause the apparatus to:
   identify a format configuration for the resources based at least in part on the first TTI duration, the first TTI duration comprising a slot or duration less than the slot, and wherein the format comprises a short physical uplink control channel (sPUCCH) format 3 or an sPUCCH format 4.

43. The apparatus of claim 24, wherein the instructions are further executable by the processor to cause the apparatus to:
   determine an absence of downlink control information (DCI) comprising an ACK/NACK resource indicator (ARI) for the first uplink control channel message, wherein determining the resources of the first uplink control channel message to be used for transmission of the SR and the ACK/NACK information is based on the absence of the DCI.

44. The apparatus of claim 24, wherein the instructions are further executable by the processor to cause the apparatus to:
   receive an SR configuration that indicates the SR is to be transmitted on the first uplink control channel message.

* * * * *